US010331963B2

(12) United States Patent
Nakano et al.

(10) Patent No.: US 10,331,963 B2
(45) Date of Patent: Jun. 25, 2019

(54) CAMERA APPARATUS AND IN-VEHICLE SYSTEM CAPTURING IMAGES FOR VEHICLE TASKS

(71) Applicant: DENSO CORPORATION, Kariya, Aichi-pref. (JP)

(72) Inventors: Toshihisa Nakano, Kariya (JP); Yasuki Furutake, Kariya (JP); Daisuke Takama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 122 days.

(21) Appl. No.: 15/198,539

(22) Filed: Jun. 30, 2016

(65) Prior Publication Data

US 2017/0001565 A1 Jan. 5, 2017

(30) Foreign Application Priority Data

Jun. 30, 2015 (JP) ................. 2015-131311

(51) Int. Cl.
| | |
|---|---|
| *H04N 7/18* | (2006.01) |
| *G06K 9/00* | (2006.01) |
| *B60R 1/04* | (2006.01) |
| *B60R 11/04* | (2006.01) |
| *H04N 5/225* | (2006.01) |
| *H04N 5/247* | (2006.01) |
| *B60R 1/12* | (2006.01) |

(52) U.S. Cl.
CPC ............ *G06K 9/00812* (2013.01); *B60R 1/04* (2013.01); *B60R 11/04* (2013.01); *G06K 9/00791* (2013.01); *H04N 5/2252* (2013.01); *H04N 5/2254* (2013.01); *H04N 5/2257* (2013.01); *H04N 5/247* (2013.01); *B60R 2001/1215* (2013.01); *G06K 9/00798* (2013.01); *G06K 9/00805* (2013.01); *G06K 9/00825* (2013.01)

(58) Field of Classification Search
CPC .................................................. G06K 9/00812
USPC .......................................................... 348/148
See application file for complete search history.

(56) References Cited

U.S. PATENT DOCUMENTS

| | | | | |
|---|---|---|---|---|
| 4,568,187 A | * | 2/1986 | Kita .......................... | G01J 3/18 356/328 |
| 5,796,094 A | * | 8/1998 | Schofield ............... | B60N 2/002 250/208.1 |

(Continued)

FOREIGN PATENT DOCUMENTS

| | | |
|---|---|---|
| JP | 2002-053080 | 2/2002 |
| JP | 2014-164461 | 9/2014 |

(Continued)

*Primary Examiner* — Leron Beck
(74) *Attorney, Agent, or Firm* — Knobbe, Martens, Olson & Bear, LLP

(57) ABSTRACT

In a camera apparatus, a camera module has a predetermined field of view, and is configured to capture an image in front of the vehicle via a predetermined wiping area of the windshield of the vehicle. In the camera module, a lens unit includes a plurality of lenses. A barrel is configured to house the lens unit. An imager has an imaging surface, and is arranged with respect to the lens unit such that light passing through the plurality of lenses of the lens unit forms an image on the imaging surface. The imager includes at least part of an exposure controller that controls an exposure of the imaging surface. The imaging surface is concavely curved.

12 Claims, 8 Drawing Sheets

(56) References Cited

U.S. PATENT DOCUMENTS

| | | | | |
|---|---|---|---|---|
| 6,611,282 B1* | 8/2003 | Trubko | ................. | G02B 13/06 |
| | | | | 348/36 |
| 7,460,165 B2* | 12/2008 | Anderson | ......... | H01L 27/14603 |
| | | | | 257/E27.131 |
| 7,881,496 B2* | 2/2011 | Camilleri | ................. | B60R 1/00 |
| | | | | 340/904 |
| 8,917,169 B2* | 12/2014 | Schofield | ............... | B60N 2/002 |
| | | | | 340/425.5 |
| 9,167,140 B2* | 10/2015 | Nakajima | ............ | H04N 5/2253 |
| 9,827,918 B2* | 11/2017 | Hutzel | ................... | B60R 1/008 |
| 2003/0025793 A1* | 2/2003 | McMahon | ............ | H04N 7/181 |
| | | | | 348/148 |
| 2005/0061950 A1* | 3/2005 | Jiang | ................ | H01L 27/14627 |
| | | | | 250/208.1 |
| 2006/0115120 A1* | 6/2006 | Taniguchi | ................ | B60R 1/00 |
| | | | | 382/104 |
| 2008/0056535 A1* | 3/2008 | Bergmann | ............ | G01C 21/30 |
| | | | | 382/103 |
| 2008/0074761 A1* | 3/2008 | Yamakawa | ............ | G02B 13/04 |
| | | | | 359/794 |
| 2008/0246866 A1* | 10/2008 | Kinoshita | ................ | G02B 7/02 |
| | | | | 348/294 |
| 2009/0147116 A1* | 6/2009 | Koyama | ................... | B60R 1/00 |
| | | | | 348/294 |
| 2011/0080481 A1* | 4/2011 | Bellingham | .............. | B60R 1/12 |
| | | | | 348/148 |
| 2013/0250109 A1* | 9/2013 | Yokota | ................ | H04N 5/2254 |
| | | | | 348/148 |
| 2013/0278714 A1 | 10/2013 | Hirose | | |
| 2013/0335561 A1* | 12/2013 | Kourogi | ............. | B60R 21/0134 |
| | | | | 348/140 |
| 2014/0015997 A1 | 1/2014 | Baba | | |
| 2014/0063145 A1* | 3/2014 | Iwamuro | .................. | B41J 2/175 |
| | | | | 347/86 |
| 2014/0355141 A1* | 12/2014 | Kadowaki | ............. | G02B 7/023 |
| | | | | 359/823 |
| 2015/0042798 A1* | 2/2015 | Takeda | ................ | H04N 5/2252 |
| | | | | 348/148 |
| 2017/0129391 A1* | 5/2017 | Solar | ...................... | B60Q 1/143 |

FOREIGN PATENT DOCUMENTS

| | | |
|---|---|---|
| JP | 2015-031564 | 2/2015 |
| WO | WO 2012/173026 A1 | 12/2012 |

\* cited by examiner

CAMERA APPARATUS AND IN-VEHICLE SYSTEM CAPTURING IMAGES FOR VEHICLE TASKS

CROSS REFERENCE TO RELATED APPLICATION

This application is based on and claims the benefit of priority from Japanese Patent Applications No. 2015-131311 filed on Jun. 30, 2015, the disclosure of which is incorporated in its entirety herein by reference.

TECHNICAL FIELD

The present disclosure relates to vehicular camera apparatuses either installable to or actually installed to vehicles, and to in-vehicle systems, which are installed to vehicles and each equipped with such a camera apparatus.

BACKGROUND

To improve the safety of vehicles, camera apparatuses are installed to vehicles. Such a camera apparatus picks up, i.e. captures, images in front of the own vehicle. Then, a recognition apparatus installed in the own vehicle runs various application programs installed thereto using the captured images to recognize objects, such as pedestrians and other vehicles, in front of the own vehicle. Japanese Patent Application Publication No. 2014-164461 discloses methods and apparatuses for detecting pedestrians based on images acquired by such a camera apparatus.

SUMMARY

Users of vehicles have requirements for camera apparatuses capable of picking up higher quality images to increase the accuracy of these application programs to a higher level.

In view these requirements, a first aspect of the present disclosure seeks to provide camera apparatuses installable to vehicles, which aim to address these requirements. In particular, a second aspect of the present disclosure seeks to provide such camera apparatuses installable to vehicles, each of which is capable of picking up higher-quality images. A third aspect of the present disclosure also seeks to provide in vehicle systems, each of which includes such a camera apparatus.

According to a first exemplary aspect of the present disclosure, there is provided a camera apparatus installable to a vehicle that includes a windshield and an electronic device installed thereto. The camera apparatus includes a camera module, a first processing unit, a second processing unit, a communication interface, a power source, a housing, a cover, and a mounting member.

The camera module has a predetermined field of view and configured to capture an image in front of the vehicle via a predetermined wiping area of the windshield of the vehicle. The first processing unit is configured to perform, based on the image captured by the camera module, at least part of a recognition task that recognizes situations in front of the vehicle. The second processing unit is configured to perform, based on a result of the recognition task performed by the first processing unit, at least part of a vehicle control task. The vehicle control task includes at least two of: a lane departure warning task for determining whether there is an unintentional departure of the vehicle from a lane on which the vehicle is running; a headlight control task for controlling a headlight of the vehicle; and a task for preventing front collisions of the vehicle.

The communication interface enables the first and second processing units to communicate with the electronic device installed in the vehicle. The power source supplies electrical power to the camera module, the first processing unit, and the second processing unit. The housing is configured to house at least part of at least one of the camera module, the first processing unit, the second processing unit, the communication interface, and the power source. The cover is configured to cover at least part of at least one of the camera module, the first processing unit, the second processing unit, the communication interface, the power source, and the housing. The mounting member is configured to fixedly mount the camera module to the windshield of the vehicle such that the field of view of the camera module is directed in front of the vehicle The camera module includes a lens unit including a plurality of lenses, and a barrel configured to house the lens unit. The camera module includes an imager having an imaging surface and arranged with respect to the lens unit such that light passing through the plurality of lenses of the lens unit forms an image on the imaging surface. The imager includes at least part of an exposure controller that controls an exposure of the imaging surface. The imaging surface is concavely curved with respect to the lens unit.

The above-configured camera apparatus according to the first exemplary aspect, which includes the camera module provided with the imager having the concavely curved imaging surface, enables higher-quality images in front of the vehicle to be captured. This enables the second processor of the camera apparatus to perform the vehicle control task with higher accuracy.

According to a second exemplary aspect of the present disclosure, there is provided an in-vehicle system including a camera apparatus installable to a vehicle, the vehicle including a windshield, a rearview mirror, and an electronic device installed thereto, and a controller installed in the rearview mirror. The camera apparatus includes a camera module, a first communication interface, a power source, a housing, a cover, and a mounting member.

The camera module has a predetermined field of view and configured to capture an image in front of the vehicle via a predetermined wiping area of the windshield of the vehicle. The first communication interface enables the camera module to communicate with the controller. The power source supplies electrical power to the camera module. The housing is configured to house at least part of at least one of the camera module, the first communication interface, and the power source. The cover is configured to cover at least part of at least one of the camera module, the first communication interface, the power source, and the housing. The mounting member is configured to fixedly mount the camera module to the windshield of the vehicle such that the field of view of the camera module is directed in front of the vehicle. The camera module includes a lens unit including a plurality of lenses, and a barrel configured to house the lens unit. The camera module includes an imager having an imaging surface and arranged with respect to the lens unit such that light passing through the plurality of lenses of the lens unit forms an image on the imaging surface. The imager includes at least part of an exposure controller that controls an exposure of the imaging surface. The imaging surface is concavely curved with respect to the lens unit.

The controller includes a second communication interface, a first processing unit, a second processing unit, a third communication interface, and a power source. The second communication interface enables the controller to communicate with the camera module. The first processing unit is configured to perform, based on the image captured by the camera module, at least part of a recognition task that recognizes situations in front of the vehicle. The second processing unit is configured to perform, based on a result of the recognition task performed by the first processing unit, at least part of a vehicle control task. The vehicle control task includes at least two of: a lane departure warning task for determining whether there is an unintentional departure of the vehicle from a lane on which the vehicle is running, a headlight control task for controlling a headlight of the vehicle, and a task for preventing front collisions of the vehicle.

The third communication interface enables the first and second processing units to communicate with the electronic device installed in the vehicle. The power source supplies electrical power to the first processing unit and the second processing unit.

The above-configured camera apparatus according to the second exemplary aspect, which includes the camera module provided with the imager having the concavely curved imaging surface, enables higher-quality images in front of the vehicle to be captured. The above-configured camera apparatus according to the second exemplary aspect enables the camera module to be downsized, because the first and second processing units are provided in the controller installed in the rearview mirror.

According to a third exemplary aspect of the present disclosure, there is provided a camera apparatus installable to a vehicle that includes a windshield and an electronic device installed thereto. The camera apparatus includes a camera module, a communication interface, a power source, a housing, a cover, and a mounting member. The camera module has a predetermined field of view, and is configured to capture an image in front of the vehicle via a predetermined wiping area of the windshield of the vehicle. The communication interface enables the camera module to communicate with the electronic device installed in the vehicle. The power source supplies electrical power to the camera module. The housing is configured to house at least part of at least one of the camera module, the communication interface, and the power source. The cover is configured to cover at least part of at least one of the camera module, the communication interface, the power source, and the housing. The mounting member is configured to fixedly mount the camera module to the windshield of the vehicle such that the field of view of the camera module is directed in front of the vehicle. The camera module includes a lens unit comprising a plurality of lenses, and a barrel configured to house the lens unit. The camera module includes an imager having an imaging surface and arranged with respect to the lens unit such that light passing through the plurality of lenses of the lens unit forms an image on the imaging surface. The imager includes at least part of an exposure controller that controls an exposure of the imaging surface. The imaging surface is concavely curved with respect to the lens unit.

The above-configured camera apparatus according to the third exemplary aspect, which includes the camera module provided with the imager having the concavely curved imaging surface, enables higher-quality images in front of the vehicle to be captured.

The above and/or other features, and/or advantages of various aspects of the present disclosure will be further appreciated in view of the following description in conjunction with the accompanying drawings.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
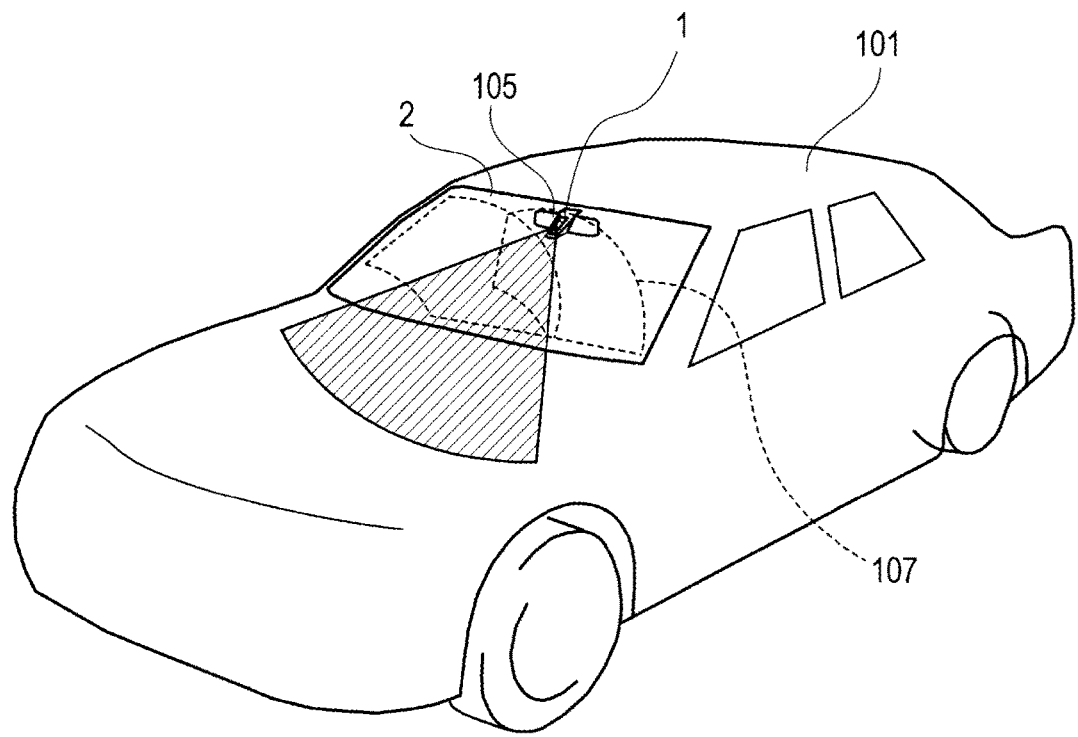
FIG. 1 is a perspective view schematically illustrating an example of the appearance of a vehicle in which a camera apparatus according to the first embodiment of the present disclosure is installed.

The following describes the first and second embodiments of the present disclosure with reference to the accompanying drawings. The following omits or simplifies descriptions of like parts between the embodiments, to which identical or like reference characters are assigned, thus eliminating redundant descriptions. Various combinations of the embodiments can be carried out as long as there are no inconsistencies in each of the combinations. One or more components disclosed in one of the embodiments can be combined with one or more components disclosed in another one of the embodiments.

First Embodiment

Arrangement of Camera Apparatus

Referring to FIG. 1, a camera apparatus 1 is mounted to, for example, a windshield, i.e. a front windshield, 2 of a vehicle 101. The camera apparatus 1 constitutes an in-vehicle system, i.e. in-vehicle control system, 100 (see FIG. 9) installed in the vehicle 101 for controlling the operations of the vehicle 101.

In particular, the camera apparatus 1 is placed at the top center of the inner surface of the windshield 2 in the horizontal direction, i.e. the width direction of the vehicle 101. In other words, the camera apparatus 1 is located on the back of a predetermined wiping area 107 of the outer surface of the windshield 2 adjacent to a rearview mirror 105 of the vehicle 101. The wiping area 107 represents an area of the outer surface of the windshield 2 that a wiper (see reference numeral 77 in FIG. 9) wipes.

The camera apparatus 1 is designed as, for example, a monocular camera apparatus according to the first embodiment. The camera apparatus 1 has a predetermined field of view, i.e. a predetermined imaging area, which extends in the front direction of the vehicle 101 to have, for example, a sector shape in the vehicle width direction. FIG. 1 schematically illustrates a part of the field of view of the camera apparatus 1.

That is, the camera apparatus 1 picks up images of a region ahead of the vehicle 101 in the field of view through, for example, a part of the windshield 2; the part of the windshield 2 corresponds to the wiping area 107. The part of the windshield 2, which corresponds to the wiping area 107, will also be referred to simply as the wiping area 107 of the windshield 2. The following also describes the vehicle 101 as an own vehicle 101.

Structure of Camera Apparatus

Figure 2:
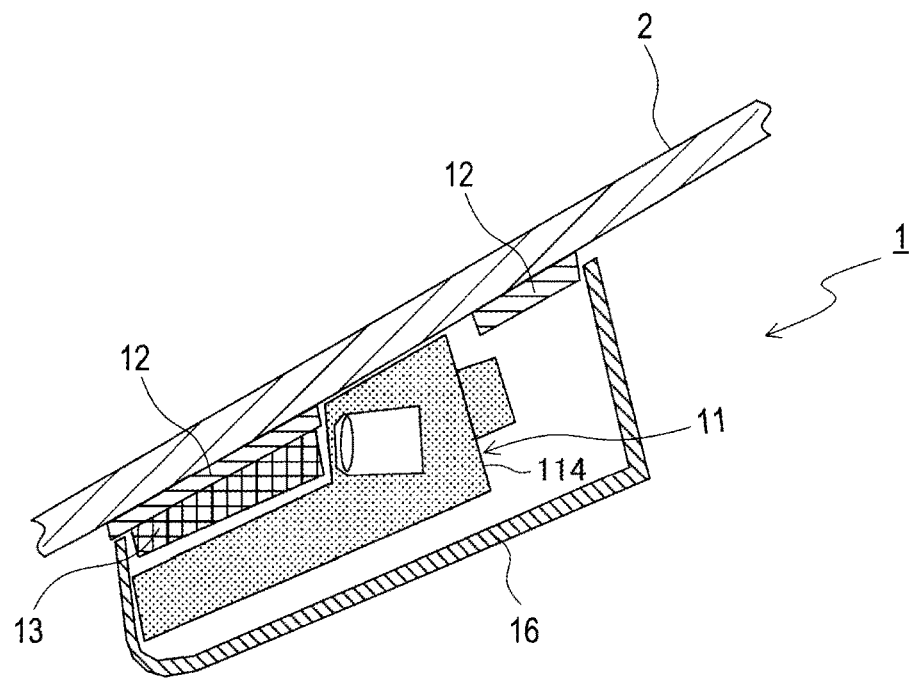
FIG. 2 is a cross sectional view schematically illustrating the camera apparatus mounted to the windshield of the vehicle.
Figure 3:
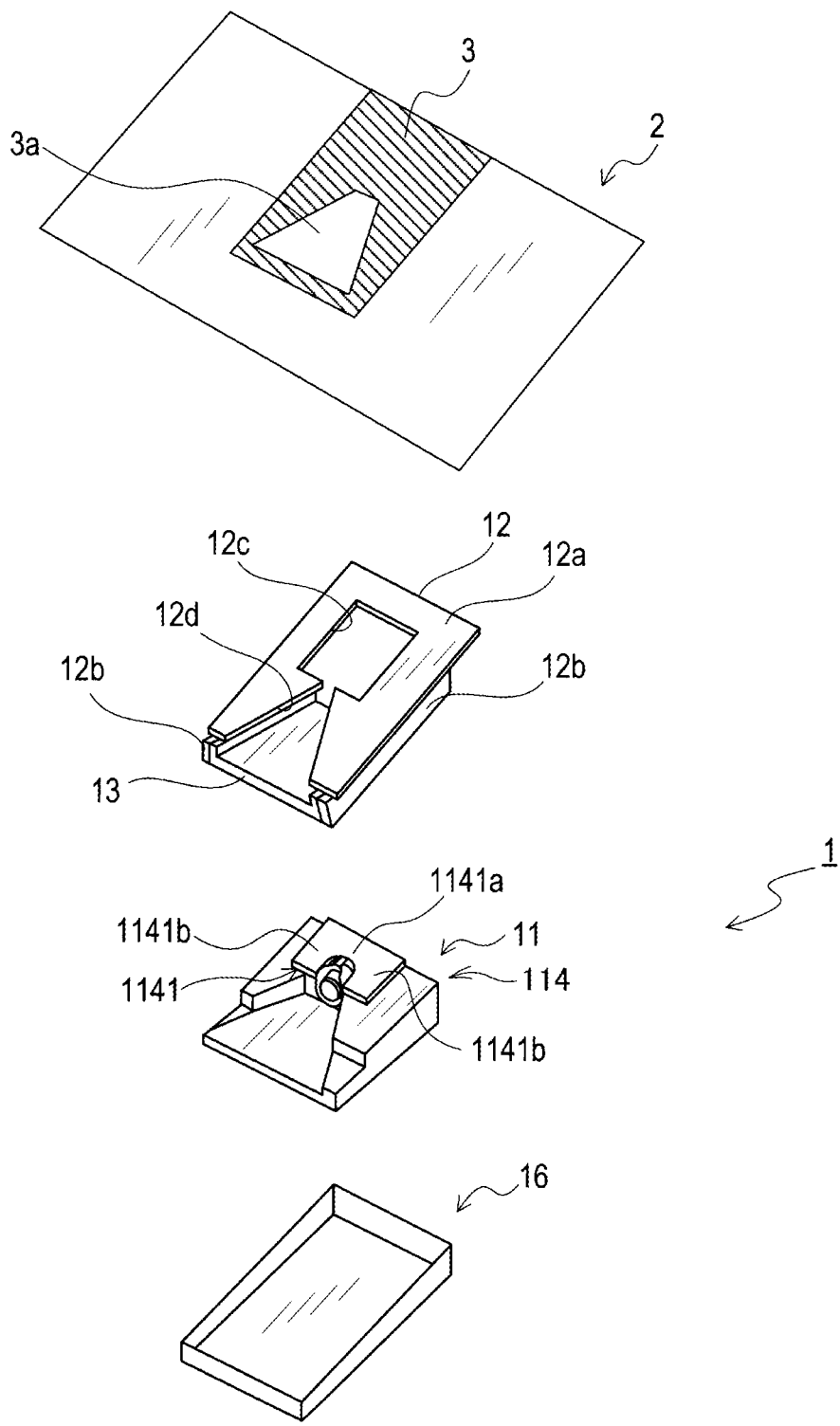
FIG. 3 is an exploded perspective view schematically illustrating the camera apparatus illustrated in FIG. 2.

The following describes an example of the structure of the camera apparatus 1 with reference to FIGS. 2 to 7. Referring to FIGS. 2 and 3, the camera apparatus 1 includes, for example, an image sensor 11, a plate-like bracket 12, a hood 13, and a cover 16.

Figure 4:
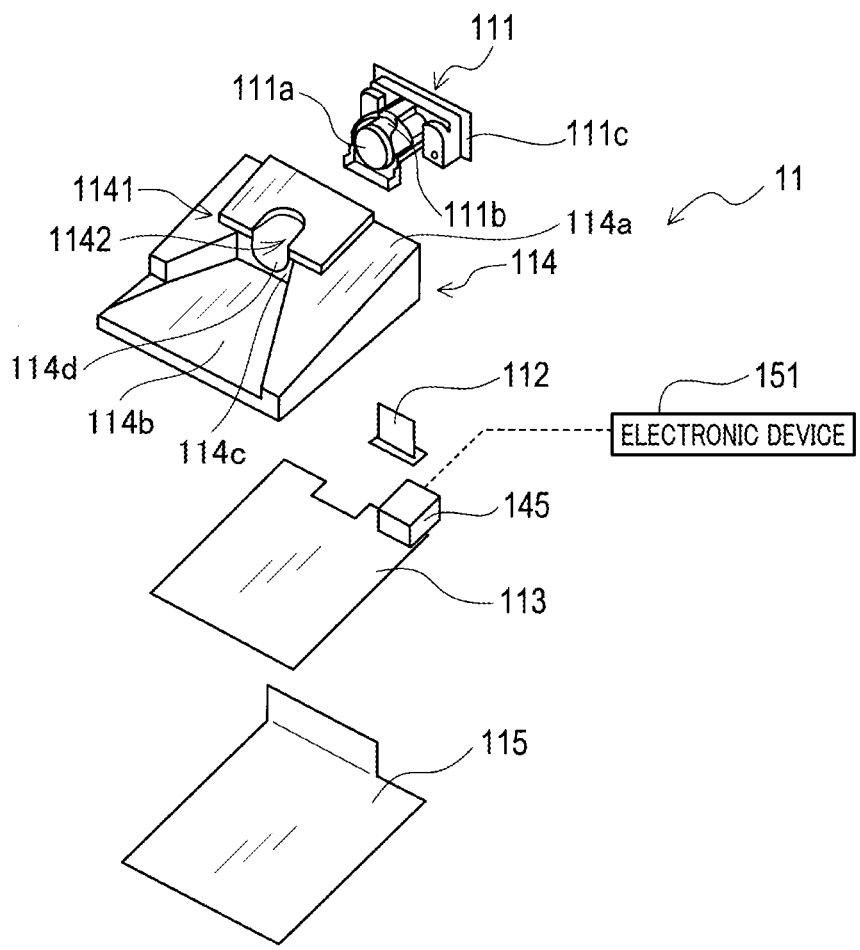
FIG. 4 is an exploded perspective view schematically illustrating an example of the structure of an image sensor of the camera apparatus illustrated in FIG. 3.
Figure 5:
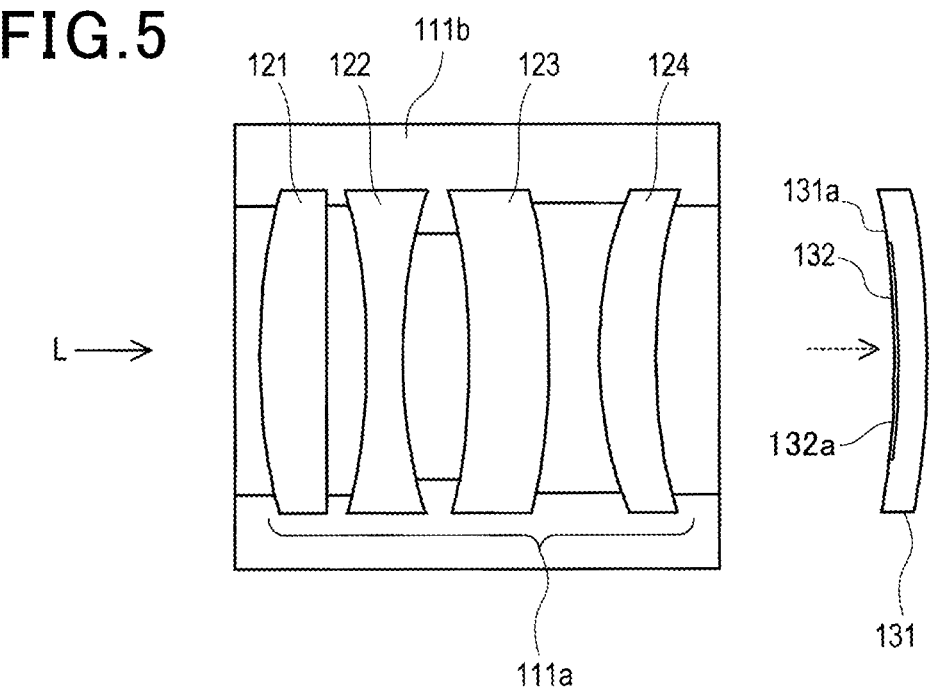
FIG. 5 is an enlarged view schematically illustrating a lens unit of a camera module of the image sensor illustrated in FIG. 4.

Referring to FIG. 4, the image sensor 11 includes, for example, a camera module 111, an electrical connection harness 112, a control board 113, a housing 114, and a bottom cover 115.

The camera module 111 aims to capture images in front of the own vehicle 101 through the wiping area 107 of the windshield 2. Specifically, the camera module 111 is comprised of a lens unit 111a, a lens barrel 111b, and an imaging board 111c Referring to FIG. 5, the lens unit 111a includes four lenses 121, 122, 123, and 124 combined to each other as an example of the assembly of a plurality of lenses. The lenses 121 to 124 are coaxially aligned with given intervals therebetween in this order from the front side to the rear side of the own vehicle 101. The lens barrel 111b has a substantially tubular shape, and houses the assembly of the lenses 121 to 124. Specifically, the assembly of the lenses 121 to 124 is coaxially installed in the lens barrel 111b while the outer peripheries of the lenses 121 to 124 are supported by the lens barrel 111b. That is, an optical axis of the lens barrel 111b coincides with an optical axis of the assembly of the lenses 121 to 124.

For example, the first embodiment uses a plano-convex lens as the lens 121, a biconcave lens as the lens 122, a first meniscus lens as the lens 123, and a second meniscus lens as the lens 124. The plano-convex lens 121 has a convex surface on a first major side directed in front of the own vehicle 101, and a plane surface on a second major side opposite to the first major side. The biconcave lens 122 has a concave surface on each major side; one of the major sides of the biconcave lens 122 faces the plano-convex lens 121.

The first meniscus lens 123 has a concave surface on a first major side, and a convex surface on a second major side opposite to the first major side; the concave surface of the first meniscus lens 123 faces the other of the major sides of the biconcave lens 122.

The second meniscus lens 124 has a convex surface on a first major side, and a concave surface on a second major side opposite to the first major side; the convex surface of the second meniscus lens 124 faces the convex surface of the first meniscus lens 123, and the concave surface thereof faces the imaging board 111c.

Note that the lens unit 111a can be comprised of at least two lenses.

The electrical connection harness 112 electrically connects electrical components of the imaging board 111c described later and the control board 113.

The imaging board 111c includes an imager 131 and a control circuit 133. The imaging board 111c has one major surface, i.e. a front surface, on which the imager 131 (see FIGS. 5 and 6) is mounted. The imager 131 has an outer major surface serving as a light receiving surface 131a, and includes a photo-sensor array 132 mounted on the light receiving surface 131a. The photo-sensor array 132 is comprised of photo sensors, i.e. semiconductor photodiodes, two-dimensionally arranged in rows and columns, or one-dimensionally arranged in a row. Each of the photo sensors has a light receiving area, so that the photo-sensor array 132 has an imaging surface 132a composed of the light receiving areas of the photo sensors.

The imaging board 111c is mounted to the lens barrel 111b such that the center of the photo-sensor array 132 is disposed to be coaxial to the lenses 121 to 124. This enables light L incident to the lens unit 111a, i.e. the lens 121, to pass through the lenses 121 to 124 so as to be formed as an image onto the photo-sensor array 132, thus picking up the image.

The photo-sensor array 132 converts the picked-up image based on the incident light L into an image signal including pixels measured by the photo sensors, and outputs the image signal based on the picked-up image to the control circuit 133. Note that the assembly of the lenses 121 to 124 is operative to form an image on the photo-sensor array 132 while reducing various aberrations in the formed image. In other words, the number and configurations of lenses constituting the lens unit 111a are determined to, for example, form an image on the photo-sensor array 132 while reducing aberrations in the formed image.

In particular, the imager 131 is configured such that the light receiving surface 131a and the photo-sensor array 132 are concavely curved with respect to the lens unit 111a. In other words, the imager 131 is configured such that the imaging surface 132a of the photo-sensor array 132, which is included in the light receiving surface 131a, is concavely curved with respect to the lens unit 111a.

The first embodiment describes the detailed structure of the imager 131 later.

Figure 6:
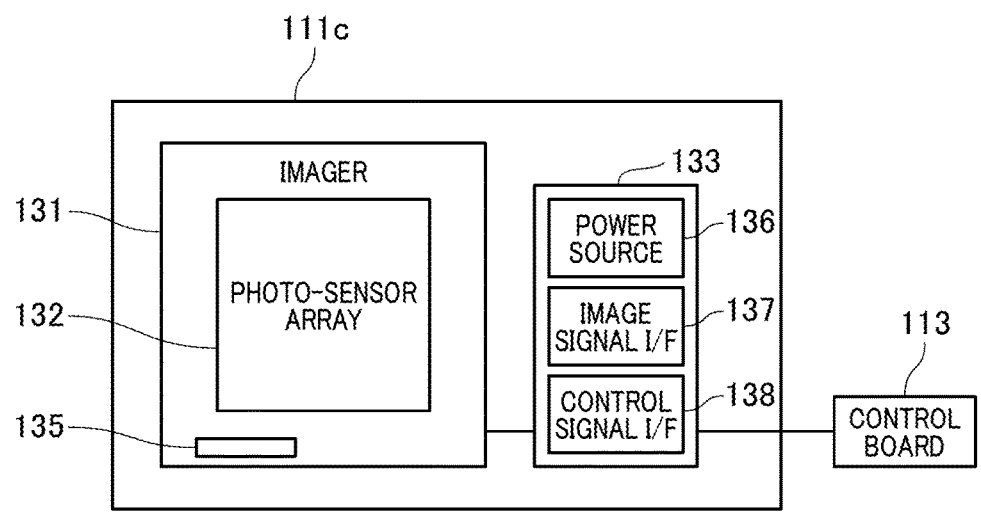
FIG. 6 is a block diagram schematically illustrating an example of the structure of an imaging board of the camera module illustrated in FIG. 4.

Referring to FIG. 6, the imager 131 includes, in addition to the photo-sensor array 132, an exposure controller 135 connected to the photo-sensor array 132. The control circuit 133 includes a power source 136, an image-signal interface, referred to an image-signal I/F, 137, and a control-signal interface, referred to a control-signal I/F, 138.

The exposure controller 135 is capable of controlling the exposure of the imaging surface 132a, i.e. the photo-sensor array 132. Specifically, the exposure controller 135 receives the image signal output from the imager 131, and measures, for example, the intensities of all the pixels of the picked-up image. Then, the exposure controller 135 adjusts the exposure, i.e. the length of exposure or the exposure time, of the photo-sensor array 132 based on the measured intensities of all the pixels of the picked-up image.

The power source 136 supplies operating power to each of the electrical components constituting the imaging board 111c.

The control circuit 133 is connected to the control board 113. The image-signal I/F 137 receives the image signal output from the imager 131, and outputs the image signal to the control board 113.

The control-signal I/F 138 receives control signals sent from the control board 113 described hereinafter; the control signals are operative to control how the imager 131 operates. That is, the control-signal I/F 138 enables the control signals sent from the control board 113 to control the photo-sensor array 132 and the exposure controller 135 of the imager 131.

Figure 7:
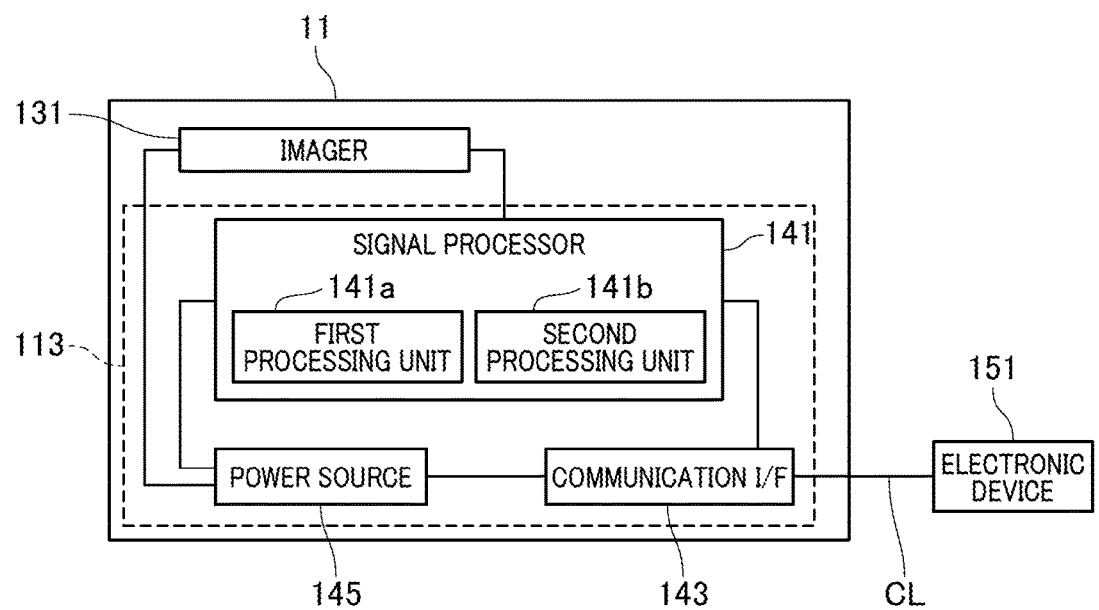
FIG. 7 is a block diagram schematically illustrating an example of the functional structure of the image sensor illustrated in FIG. 3.

The following describes electrical functions of the image sensor 11 with reference to FIG. 7. The control board 113 of the image sensor 11 includes a signal processor 141, a communication interface, referred to as a communication I/F, 143, and a power source 145.

The signal processor 141 essentially includes, for example, a CPU, a memory, such as a ROM and/or a RAM, an I/O, and a bus connecting between the CPU, memory, and I/O. The signal processor 141 is connected to the imager 131, the power source 145, and the communication I/F 143. The signal processor 141 functionally includes a first processing unit 141a and a second processing unit 141b. In other words, the signal processor 141 serves as both the first and second processing units 141a and 141b.

The first processing unit 141a performs, based on one or more image captured by the camera module 111, a recognition task that recognizes the situations around the own vehicle 101.

The second processing unit 141b, which is operatively connected to the first processing unit 141a, performs, based on the recognized situations around the own vehicle 101, a vehicle control task that controls at least one of the actuators or other similar devices installed in the own vehicle 101. The following describes some targets recognized by the recognition task later, and describes the details of the vehicle control task later.

The communication I/F 143 serves as an interface that enables each of the first and second processing units 141a and 141b to communicate with electronic devices 151 installed in the own vehicle 101. For example, the communication I/F 143 includes connectors and an electric or electronic circuit when the image sensor 11 is connected to the electronic devices 151 via communication lines CL. The connectors are individually connected to the communication lines, and the electronic circuit establishes communications between the electronic devices 151 and each of the first and second processing units 141a and 141b. The following defines an interface as a module including at least one connector and an electronic circuit that can establish communications with one or more components connected to the at least one connector.

The power source 145 is configured to receive electrical power supplied from an accessory power source and/or a battery installed in the own vehicle 101. Then, the power source 145 supplies electrical power to the camera module 111 including the imager 131, and the control board 113 including the signal processor 141.

Referring to FIG. 4, the housing 114 has a substantially rectangular parallelepiped shape with a top wall 114a, an opening bottom wall, and an inner hollow container space. The housing 114 covers the assembly of the camera module 111 and the control board 113 from above to house the assembly accordingly.

The bottom cover 115 is disposed at a lower side of the control board 113 to close the opening bottom of the housing 114. That is, the camera module 111, the control board 113, the power source 145, and the electrical connection harness 112 are contained in the assembly of the housing 114 and the bottom cover 115, so that the camera apparatus 1 is constructed.

The top wall 114a of the housing 114 is inclined toward the front side of the own vehicle 101. A rectangular part of a rear half portion of the top wall 114a is protruded upward to form a protruded wall 1141. The protruded wall 1141 serves as an attachment wall to, for example, the windshield 2 of the own vehicle 101 (see FIG. 2). Hereinafter, the protruded wall 1141 will be referred to as an attachment wall 1141.

The attachment wall 1141 has a substantially U-shaped concave recess 1141a formed in a front surface thereof to a substantially center of the attachment wall 114b, so that a top surface of the attachment wall 1141 has a substantially concave shape. In other words, the attachment wall 1141 is comprised of a left-hand end and a right-hand end that sandwiches the U-shaped concave recess 1141a.

The housing 114 has a trapezoidal concave recess 114b formed in the top surface 114a downward. The trapezoidal concave recess 114b has a vertical wall 114c located close to the front surface of the attachment wall 1141. The vertical wall 114c has a top surface intersecting with the front surface of the attachment wall 1141, so that the vertical wall 114c and the attachment wall 1141 constitute a downward stepped portion. The vertical wall 114c has a concave recess 114d formed in the top surface of the vertical wall 114c and communicating with the U-shaped concave recess 1141a. The U-shaped concave recess 1141a and the concave recess 114d constitute an opening 1142 for exposing the lens unit 111a and the lens barrel 111b to the front direction of the own vehicle 101 and to the windshield 2.

When the housing 114 is attached to the windshield 2 with the bracket 12 in a method described later so as to be fixed to the windshield 2, the attachment wall 1141 is located to be closer to the windshield 2 than the camera module 111 is.

Referring to FIGS. 2 and 3, the bracket 12 is configured to fixedly mount the housing 114 of the image sensor 11 to the windshield 2. The bracket 12, which is made of, for example, resin or metal, includes a rectangular plate-like portion 12a disposed along the windshield 2; the plate-like portion 12a has a first surface facing the windshield 2 and a second surface opposite to the first surface. The bracket 12 also includes a pair of sidewalls 12b each mounted perpendicularly to a corresponding one of the longitudinal edges of the second surface of the plate-like portion.

The plate-like portion 12a has a substantially rectangular opening 12c formed therethrough. The plate-like portion 12a has a first lateral end corresponding to the rear side of the own vehicle 101 and a second lateral end opposite to the first lateral end and corresponding to the front side of the own vehicle 101. The plate-like portion 12a also has a substantially trapezoidal recess, in other words, notch, 12d extending from the second lateral end to the opening and communicating with the opening 12c. The opening 12a and the trapezoidal recess 12d result in the plate-like portion 12a having a substantially U shape.

The sidewalls 12b are disposed at both sides of the opening 12c and the trapezoidal recess 12d. The above bracket 12 is configured such that the hood 13 is fitted in the trapezoidal recess 12d between the sidewalls 12b.

Specifically, the top surface 12a of the bracket 12 is fixedly mounted, for example, adhered, to the inner surface of the windshield 2. The housing 114 is mounted to the bracket 12 fixedly mounted on the inner surface of the windshield 2 such that the attachment wall 1141 of the housing 114 faces the windshield 2.

While the housing 114 is mounted to the windshield 2 via the bracket 12, the opening 12c of the bracket 12 enables the housing 114 to face the windshield 2. The situation where the housing 114 faces the windshield 2 means that the housing 114 fronts the windshield 2 without any intervening members therebetween.

While the housing 114 is mounted to the windshield 2 via the bracket 12, the trapezoidal recess 12d is located in front of the camera module 111. The trapezoidal recess 12d has a substantially trapezoidal shape so as to become broader in width toward the front side of the camera module 111; the recess 12d is in conformance with a horizontally sector imaging region, i.e. a horizontal view-angle region, of the lens unit 111a of the camera module 111 extending in front of the lens unit 111a. This enables the field of view of the lens unit 111a, i.e. the camera module 111, to be sufficiently ensured.

As described above, the bracket 12 is configured to mount the camera module 111 to the windshield 2 such that the field of view of the camera module 111 is provided in front of the own vehicle 101. The bracket 12 serves as, for example, an example of mount members in the present disclosure.

The hood 13 is made of, for example, a resin, and has a substantially trapezoidal bottom surface, and a pair of opposing side surfaces perpendicular to respective oblique sides of the trapezoidal bottom surface. The hood 13 is mounted between the sidewalls 12b of the bracket 12 with the trapezoidal bottom surface facing the recess 12d. Specifically, when the housing 114 is attached to the bracket 12, the hood 13 is mounted on or above the bottom surface of the trapezoidal concave recess 114b such that the bottom surface and the opposing side surfaces of the hood 113 surround the substantially sector imaging region (horizontal view-angle region). The imaging region substantially corresponds to the field of view of the lens assembly 111a, i.e. the camera module 111. In particular, the hood 113 is mounted to the trapezoidal concave recess 114b such that the bottom surface of the hood 113 is located to be lower than the lens barrel 111b of the camera module 111.

The above arrangement of the hood 113 reduces the possibility that objects located outside of the sector imaging region of the camera module 111 are captured by the camera module 111.

For example, the bracket 12 according to the first embodiment is adhered to the windshield 2. In particular, the bracket 12 is adhered to a black ceramic sheet 3. Thereafter, the black ceramic sheet 3 is closely contacted on the inner surface of the front windshield 102. The black ceramic sheet 3 has a transparent opening 3a facing the trapezoidal recess 12d of the bracket 12. The transparent opening 3a prevents the black ceramic sheet 3 from blocking the sector imaging region of the camera module 111.

The cover 16 has a substantially rectangular parallelepiped shape with an opening top wall, a bottom wall, and an inner hollow container space. The cover 16 covers the image sensor 11, the bracket 12, and the hood 13 from below to reduce the possibility of the bracket 12 and hood 13 being visible from the inside of the own vehicle 101.

Structure of Imager

Figure 8:
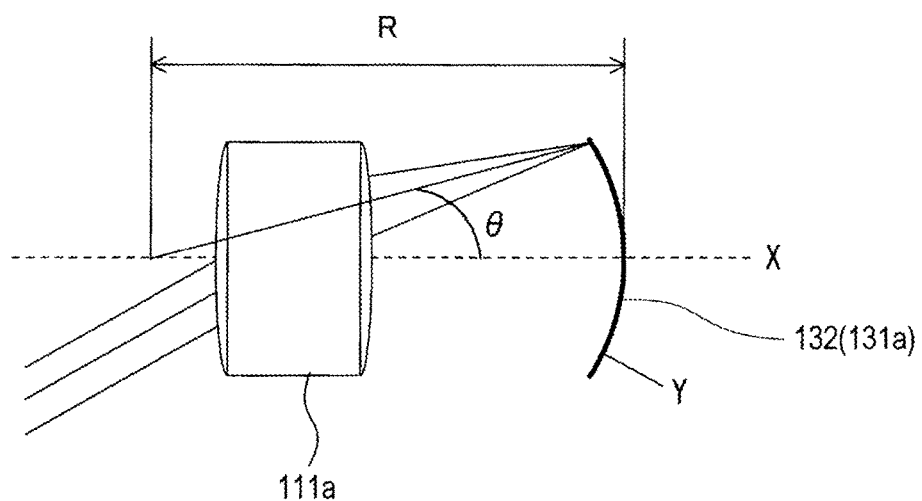
FIG. 8 is an enlarged view schematically illustrating an example of the arrangement relationships between the lens unit and a photo-sensor array of the imager according to the first embodiment.

The imager 131 of the imaging board 111c has the light receiving surface 131a that has a concavely curved shape with respect to the lens unit 111a. In other words, the imager 131 is configured as a curved imager, i.e. a curved image sensor. The following describes the shape of the imager 131 in accordance with FIG. 8. For example, FIG. 8 schematically illustrates the lens unit 111a as a single biconvex lens, and schematically illustrates only the photo-sensor array 132 mounted on the light-receiving surface 131a as the imager 131.

For example, each of the light receiving surface 131a and the photo-sensor array 132, i.e. its imaging surface 132a, has a radius R of curvature at any point thereon. The photo-sensor array 132 of the imager 131 is arranged with respect to the lens unit 111a such that light passing through the lens unit 111a forms an image on the imaging surface 132a of the photo-sensor array 132. More specifically, the lens unit 111a and the photo-sensor array 132 are arranged such that, if the angle formed between a principal ray from a light source, i.e. a target object, and the optical axis X becomes zero degrees, the light collection efficiency of the photo-sensor array 132 with respect to light rays from the corresponding light source becomes the maximum efficiency. Note that a principal ray is defined as a selected ray in rays from a given point, such as a light source; the selected ray passes through the center of a diaphragm or an aperture of the lens unit 111a comprised of the lenses 121 to 124.

The condition required for the edge portion of the imaging surface 132a of the photo-sensor array 132 to have sensitivity as high as the center portion thereof is defined by the following equation (1):

$$R = Y/(2\theta) \qquad (1)$$

Where R represents the radius of curvature at any point on the imaging surface 132a, Y represents the length of an arc connecting diagonal points of one pair of the imaging surface 132a, and $\theta$ represents an angle in radian formed between a principal ray incident to the imaging surface 132a and an optical axis X of the lens unit 11a.

The camera module 111, which is mounted to the top portion of the inner surface of the windshield 2 in the own vehicle 101, results in an angle $\theta$ formed between a principal ray from a light source, which is incident to the imaging surface 132a, and the optical axis X being within the range defined by the following equation (2):

$$\pi/36 < \theta < \pi/6 \qquad (2)$$

Note that the range of the angle $\theta$ defined by the equation (2) is, for example, empirically derived from many product designs carried out by the inventors.

The equations (1) and (2) lead to the limitation that the radius R of curvature at any point on the imaging surface 132a is preferably set within the range defined by the following equation (3) to meet the equations (1) and (2):

$$3/\pi < R/Y < 18/\pi \qquad (3)$$

Determining the structure of the photo-sensor array 132 to meet the equation (3) restricts an incident angle from a light source to the imaging surface 132a of the photo-sensor array 132 from increasing, thus reducing the level of peripheral shading of the photo-sensor array 132a.

Note that Y represents the length of an arc along any diameter of the imaging surface 132a if the imaging surface 132a has a circular shape.

Electrical Structure of Vehicle Control System Using Camera Apparatus

Figure 9:
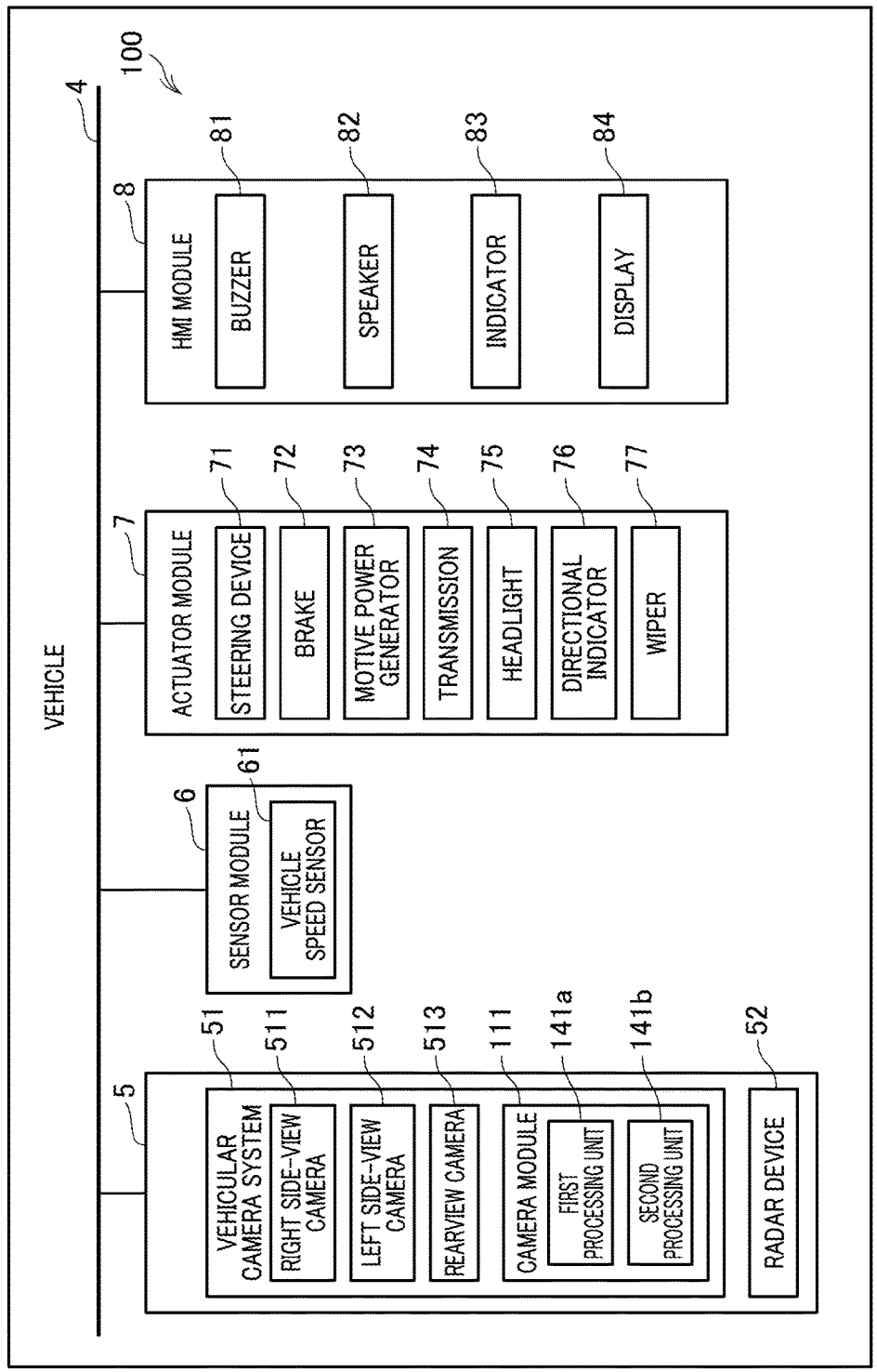
FIG. 9 is a block diagram schematically illustrating an example of the functional structure of an in-vehicle system according to the first embodiment.

The following describes an example of the electrical structure of the in-vehicle system 100 including the camera apparatus 1 with reference to FIG. 9. FIG. 9 schematically illustrates an example of the in-vehicle system 100 as a part of the total control system installed in the own vehicle 101.

Referring to FIG. 9, the in-vehicle system 100 includes a monitor module 5, a sensor module 6, an actuator module 7, a Human Machine Interface (HMI) module 8, and a common bus 4 through which the modules 5 to 8 are communicable.

The monitor module 5 includes an in-vehicle camera system 51 and a radar device 52, which serve as devices for monitoring the environmental situations around the own vehicle 101.

For example, the in-vehicle camera system 51 includes, in addition to the camera module 111, i.e. the camera apparatus 1, a right side-view camera 511, a left side-view camera 512, and a rearview camera 513. The right side-view camera 511 is for example attached to the right side-view mirror of the own vehicle 101 for picking up images of right-hand views from the own vehicle 101. The left side-view camera 512 is for example attached to the left side-view mirror for picking up images of left-hand views from the own vehicle 101. The rearview camera 513 is for example attached to the rear portion, such as the rear gate, of the own vehicle 101 for picking up rear views from the own vehicle 101.

The radar device 52 is operative to transmit probing waves, such as radar waves within a millimeter waveband or laser waves, to a predetermined scan region, and receive echoes from at least one object based on the transmitted probing waves. Based on the received echoes, the radar device 52 is operative to generate object information including at least (1) The distance of the at least one object relative to the own vehicle 101

(2) The relative speed of the at least one object with respect to the own vehicle 101 if the at least one object is a moving object (3) The lateral position of the at least one object relative to the own vehicle 101 in the lateral direction of the own vehicle 101.

The radar device 52 is also operative to output the object information to the first processing unit 141a of the signal processor 141.

The radar device 52 can include a sonar for transmitting ultrasonic waves as the probing waves and for receiving echoes based on the ultrasonic waves from at least one object.

The sensor module 6 is operative to measure the operating conditions, i.e. travelling conditions, of the own vehicle 101 or devices installed in the own vehicle 101. For example, the sensor module 6 includes a vehicle speed sensor 61 operative to measure the speed, i.e. the travelling speed, of the own vehicle 101, and output, to the bus 4, a sensor signal indicative of the measured speed of the own vehicle 101. The sensor signal sent from the vehicle speed sensor 61 is output to the signal processor 141 via the bus 4. The sensor signal can be input to ECUs installed in the own vehicle 101, such as an engine ECU. The ECUs can be operative to execute various tasks based on the input sensor signal, and output the executed results of the various tasks to the bus 4. At that time, the signal processor 141 can receive the executed results of the various tasks via the bus 4.

The actuator module 7 includes actuators installed in the own vehicle 101; the actuators are controllable by, for example, the signal processor 141.

The actuators to be controlled by the signal processor 141 include at least three types of actuators:

The first type of actuators are used for controlling a body system of the own vehicle 101.

The second type of actuators are used for controlling a power-train system of the own vehicle 101.

The third type of actuators are used for controlling a chassis system of the own vehicle 101.

For example, the actuators, in other words, the target devices, to be controlled by the signal processor 141, include a steering device 71, a brake 72, a motive power generator 73, an automatic transmission 74, headlights 75, directional indicators 76, and wipers 77.

The steering device 71 is operative to assist the driver's steering of the steering wheel of the own vehicle 101. The brake 72 is operative to slow down the own vehicle 101. The motive power generator 73 is comprised of, for example, an internal combustion engine and/or a motor, and is operative to generate motive power for travelling the own vehicle 101. The automatic transmission, referred to simply as a transmission 74, is operative to convert a rotational speed and torque as the motive power generated by the motive power generator 73 into an adjusted rotational speed and adjusted torque, and supply the adjusted rotational speed and adjusted torque to driving wheels of the own vehicle 101.

The headlights 75 are operative to light up the road on which the own vehicle 101 is travelling. Each of the directional indicators 76 is operative to flash when the own vehicle 101 is about to turn in a corresponding direction, i.e. right or left, or to make a corresponding lane change. The wipers 77 are operative to clean the respective front windshield 2 and rear windshield from rain, snow, or other moisture.

The HMI module 8 is operative to provide interfaces between occupants in the own vehicle 101 and the in-vehicle system 100. For example, the HMI module 8 includes a buzzer 81, a speaker 82, at least one indicator 83, at least one display 84, and actuators of the respective devices 81 to 84 installed in the own vehicle 101.

The buzzer 81 is operative to output a warning sound, and the speaker 82 is operative to output audible information. The at least one indicator 83 is operative to generate a light signal, and the at least one display 84 includes a navigation display and/or a head-up display installed in a center console of the own vehicle 101.

In addition, the HMI module 8 can include at least one vibration device and at least one reaction force generator (not shown). The at least one vibration device is comprised of a motor for generating vibrations of at least one of the steering wheel of the own vehicle 101 and the seats of the own vehicle 101. The at least one reaction force generator is operative to generate reaction force to be supplied to at least one of the steering wheel of the own vehicle 101 and a brake pedal of the own vehicle 101.

Specifically, the HMI module 8 is operative to activate at least one of these devices included therein to offer information to occupants of the own vehicle 101.

The HMI module 8 can include an adjusting unit that allows an occupant to input a desired level of recognition for a recognition task described later and/or a timing to start a determining task described later, thus transferring information from an occupant to the own vehicle 101.

The first processing unit 141*a* of the signal processor 141 is operative to perform a recognition task to recognize the environmental conditions around the own vehicle 101, in particular in front of the own vehicle 101, based on images picked up by the in-vehicle camera system 51 and/or the object information measured by and sent from the radar device 52.

The recognition task based on images captured by the camera module 111 of the in-vehicle camera system 51 except for the object information measured by the radar device 52 will be referred to as a first recognition task. The recognition task based on the object information measured by the radar device 52 will be referred to as a second recognition task.

The first processing unit 141*a* successively, i.e. cyclically, captures images successively picked up by the camera module 111, and performs, based on the captured images, a recognition task to recognize at least one of (1) The lanes ahead of the own vehicle 101 including a lane on which the own vehicle 101 is currently travelling, which will be referred to as lane information (2) The shape of a road ahead of the travelling own vehicle 101, which will be referred to as road shape information (3) The conditions of a road surface ahead of the travelling own vehicle 101, which will be referred to as road surface information (4) One or more light sources ahead of the own vehicle 101, which will be referred to as light source information (5) One or more preceding vehicles including vehicles travelling ahead of the own vehicle 101, which will be referred to as preceding-vehicle information (6) One or more oncoming vehicles, which will be referred to as oncoming-vehicle information (7) One or more stopped vehicles around the own vehicle 101, which will be referred to as stopped-vehicle information (8) One or more preceding pedestrians around the own vehicle 101, which will be referred to as preceding-pedestrian information (9) One or more oncoming pedestrians around the own vehicle 101, which will be referred to as oncoming-pedestrian information

(10) One or more stopping persons around the own vehicle 101, which will be referred to as stopped-person information

(11) One or more motor cycles around the own vehicle 101, which will be referred to as motor-cycle information

(12) One or more bicycles around the own vehicle 101, which will be referred to as bicycle information

(13) One or more obstacles around the own vehicle 101, which will be referred to as obstacle information

(14) One or more roadside objects around the own vehicle 101, which will be referred to as roadside-object information

(15) One or more traffic signs around the own vehicle 101, which will be referred to as traffic-sign information

(16) One or more traffic signals around the own vehicle 101, which will be referred to as traffic-signal information

(17) One or more traffic markings around the own vehicle 101, which will be referred to as traffic-marking information

(18) One or more advertising signs around the own vehicle 101, which will be referred to as advertising-sign information

(19) A tunnel through which the own vehicle 101 is going to go, which will be referred to as tunnel information

(20) One or more emergency parking bays, which will be referred to as emergency-bay information

(21) Something that blocks the view of the camera module 111, which will be referred to as camera-view blocking information

(22) Meteorological environments around the own vehicle 101, which will be referred to as meteorological-environment information

(23) Building structures around the own vehicle 101, which will be referred to as building structure information.

For example, the first processing unit 141*a* recognizes the lane markers ahead of the own vehicle 101 based on, for example, the captured images, thus recognizing the lanes ahead of the own vehicle 101 including a lane on which the own vehicle 101 is currently travelling based on the recognized lane markers.

The shape of a road represents the curvature or slope of the road, and the conditions of a road include the degree of reflection on the road surface particularly if it is raining or snowing.

The light sources include a tail lamp of a preceding vehicle and a head lamp of an oncoming vehicle, and can be recognized by the light-source recognition task 40*b* set forth above.

The preceding pedestrians are pedestrians walking, ahead of the own vehicle 101, in a direction identical to the travelling direction of the own vehicle 101, and the oncoming pedestrians are pedestrians walking, ahead of the own vehicle 101, in a direction opposite to the travelling direction of the own vehicle 101. The stopping persons are persons stopping around the own vehicle 101, and the obstacles include, for example, rocks and the like.

The roadside objects include, for example, roadside curbs, roadside guardrails, roadside poles, roadside trees, roadside fences, roadside walls, roadside buildings, roadside parked vehicles, roadside parked bicycles, roadside electric poles, and so on. An emergency parking bay is a place provided at a shoulder of a road for getting out of the flow of traffic. Something that obstructs the view of the camera module 111 includes smudges attached to a portion of the windshield 2, which is located in front of the lens unit 111*a* or to at least one of the lenses 121 to 124. Something that obstructs the view of the camera module 111 also includes sheet members or the like adhered on a portion of the windshield 2, which is located in front of the lens unit 111*a*. The meteorological environments around the own vehicle 101 represent weather information around the own vehicle 101, such as rain, snow, fog, the degree of backlight, and the like.

The first processing unit 141*a* also performs a lane-marker recognition task for each of the captured images. For example, the first processing unit 141*a* recognizes, for each of the captured images, positions of lane markers painted on the road ahead of the own vehicle 101 on which the own vehicle 101 is travelling using, for example, a binarizing process of a corresponding one of the captured images and a Hough transformation process.

The first processing unit 141*a* further performs a light-source recognition task that determines whether there is at least one light source of a vehicle appearing in each of the captured images. Specifically, the first processing unit 141*a* determines that there is at least one light source of a vehicle appearing in a currently captured image; the at least one light source has at least one of (1) An average pixel value equal to or higher than a threshold pixel value (2) A shape similar to one of previously prepared shape patterns (3) An average color is similar to one of previously prepared color patterns.

When it is determined that there is at least one light source appearing in a currently captured image, the first processing unit 141a identifies a position of the at least one light source on the currently captured image as coordinates on the currently captured image.

Next, the first processing unit 141a determines whether the at least one light source is a light source, i.e. a tail lamp, of a preceding vehicle or a light source, i.e. a head lamp, of an oncoming vehicle using, for example, one of known methods. For example, the first processing unit 141a determines that the at least one light source is a light source of an oncoming vehicle when the average color of the at least one light source is within a predetermined color range similar to white. Otherwise, the first processing unit 141a determines that the at least one light source is a light source of a preceding vehicle when the average color of the at least one light source is within a predetermined color range similar to red. Thus, the first processing unit 141a obtains information indicative of whether the at least one light source is a light source of a preceding vehicle or an oncoming vehicle.

The first processing unit 141a outputs, to the second processing unit 141b, the results of the recognition task.

The second processing unit 141b is configured to perform, based on the results of the recognition task, at least one of vehicle control tasks including (1) A lane departure warning task
(2) A lane keeping task
(3) A headlight control task
(4) A task for preventing broadside collisions
(5) A task for preventing collisions at intersections
(6) A task for preventing front collisions
(7) A sign displaying task
(8) A speed-limit displaying task
(9) An over-speed warning task
(10) An automatic wiper task
(11) A task for assisting lane changes
(12) A surround view displaying task
(13) An automatic parking task
(14) An adaptive cruise control task
(15) A blind-spot warning task
(16) A rear cross-traffic warning task
(17) A front cross-traffic warning task
(18) An inter-vehicle distance warning task
(19) A rear-end collision warning task
(20) An erroneous start preventing task.

The lane departure warning task is to determine whether there is an unintentional departure of the own vehicle 101 from a lane on which the own vehicle is running.

Specifically, the lane departure warning task is configured to determine, based on the lane information and the road shape information recognized by the first processing unit 141a, whether (1) A probability of the own vehicle 101 unintentionally leaving, i.e. departing from, the lane on which the own vehicle 101 is running is higher than a threshold probability or (2) The own vehicle 101 has unintentionally left the lane on which the own vehicle 101 was running.

The lane departure warning task is also configured to control a corresponding actuator of at least one of the warning devices 81 to 84 to activate it when it is determined that (1) The probability of the own vehicle 101 unintentionally leaving the lane on which the own vehicle 101 is running is higher than the threshold probability or (2) The own vehicle 101 has unintentionally left the lane on which the own vehicle 101 was running.

The at least one of the warning devices 81 to 84 is activated to output warning information for the occupants of the own vehicle 101.

For example, each of the buzzer 81 and the speaker 82 is activated to output warning sound for the occupants of the own vehicle 101.

The lane departure warning task can be configured to send a control signal to the actuator of the steering device 71 to adjust the steering angle of the steering wheel when it is determined that (1) The probability of the own vehicle 101 unintentionally leaving the lane on which the own vehicle 101 is running is higher than the threshold probability or (2) The own vehicle 101 has unintentionally left the lane on which the own vehicle 101 was running.

The lane keeping task is configured to send, based on the lane information and the road shape information, a control signal to the actuator of the steering device 71 to adjust the steering angle of the steering, thus keeping the own vehicle 101 within the lane on which the own vehicle 101 is travelling.

The headlight control task, i.e. high- and low-beam switching task and swiveling task, is configured to send, based on the lane information, the road shape information, the road surface information, and the light-source information, (1) Control signals to first actuators of the headlights via 75 for changing the beams of light output from the headlights 75 between high and low beams (2) Control signals to second actuators of the headlights 75 for swiveling the axes of the beams of light output from the headlights 75 in the lateral direction of the own vehicle 101.

The task for preventing broadside collisions is configured to (1) Determine whether a probability that the own vehicle 101 will collide with at least one moving object, such as a vehicle, a motor cycle, a bicycle, or the like, which is crossing before an intersection in front of the own vehicle 101, is higher than a predetermined threshold value (2) Send a control signal to a target actuator, such as the actuator of at least one of the steering device 71 and the brake 72, to control the target actuator when it is determined that the probability is higher than the threshold value, thus avoiding the collision.

The task for preventing collisions at intersections is designed to (1) Determine, when the own vehicle 101 is turning at an intersection, whether a probability that the own vehicle 101 will collide with at least one object, such as a vehicle, a motor cycle, a bicycle, a pedestrian, or the like, located around the own vehicle 101, is higher than a predetermined threshold value (2) Send a control signal to a target actuator, such as the actuator of at least one of the steering device 71 and the brake 72, to control the target actuator when it is determined that the probability is higher than the threshold value, thus avoiding the collision.

The task for preventing front collisions is designed to (1) Determine whether a probability that the own vehicle 101 will collide with at least one object, such as a preceding vehicle, a motor cycle, a bicycle, a pedestrian, or the like, located ahead of the own vehicle 101 is higher than a predetermined threshold value (2) Send a control signal to a target actuator, such as the actuator of at least one of the steering device 71 and the brake 72, to control the target actuator when it is determined that the probability is higher than the threshold value, thus avoiding the collision.

Note that each of the tasks for preventing broadside collisions, the task for preventing collisions at intersections, and the task for preventing front collisions includes a task for 1. Determining whether the own vehicle 101 can pass through a tunnel or below an adverting sign when the tunnel or the advertising sign is detected ahead of the own vehicle 101

2. Sending a control signal to a target actuator, such as the actuator of at least one of the buzzer 81 and the speaker 82, to control the target actuator when it is determined that the own vehicle 101 cannot pass through the detected tunnel or below the detected adverting sign, thus avoiding a collision with the detected tunnel or the detected advertising sign.

Each of the task for preventing broadside collisions and the task for preventing collisions at intersections is performed based on, for example, the results of the recognition task associated with 1. The road surface information
2. The preceding-vehicle and oncoming-vehicle information
3. The stopped-vehicle information
4. The preceding-pedestrian and oncoming-pedestrian information
5. The stopped-person information
6. The motor-cycle and bicycle information
7. The obstacle and roadside-object information
8 The advertising-sign information
9. The tunnel information.

The sign displaying task is designed to send, based on at least one of the traffic-sign information, the traffic-signal information, the traffic-marking information, and the advertising-sign information, a control signal to the actuator of the display 84. This enables the display 84 to display at least one of the traffic-sign information, the traffic-signal information, the traffic-marking information, and the advertising-sign information.

The speed-limit displaying task is designed to send, based on the traffic-sign information, a control signal to the actuator of the display 84 so that the display 84 displays a speed limit if the speed limit is indicated by the traffic-sign information.

The overspeed warning task is designed to

1. Determine whether the speed of the own vehicle 101 is exceeding the speed limit indicated by the traffic-sign information 2. Send a control signal to the actuator of at least one of the buzzer 81 and the speaker 82 when it is determined that the speed of the own vehicle 101 is exceeding the speed limit indicated by the traffic-sign information.

The control signal controls the actuator of at least one of the buzzer 81 and the speaker 82, so that at least one of the buzzer 81 and the speaker 82 audibly outputs a warning to occupants of the own vehicle 101; the warning represents the overspeed of the own vehicle 101.

The automatic wiper task is designed to (1) Determine whether the driver's visibility is lower than a predetermined threshold value based on the road surface information and the meteorological-environment information (2) Send a control signal to the actuator of at least one of the wipers 77 so that at least one of the wipers 77 is activated to clean a corresponding at least one of the front windshield 2 and rear windshield from rain, snow, or other moisture.

The task for assisting lane changes is designed to, for example, detect another vehicle travelling in a target lane adjacent to the lane on which the own vehicle 101 is travelling based on the preceding-vehicle information. Then, the task for assisting lane changes is designed to send control signals to the actuators of the respective steering device 71, brake 72, transmission 74, and directional indicator 76 to control the devices 71, 72, 74, and 76 for assisting the driver's operation for a lane change to the target lane according to the detected adjacent vehicle.

The surround view displaying task is designed to send, to the actuator of the display 84, a control signal so that the display 84 displays a surround-view image covering the surroundings of the own vehicle 101. The automatic parking task is designed to send control signals to the actuators of the respective steering device 71 and brake 72 for automatically parking the own vehicle 101 to a desired position. The adaptive cruise control task is designed to send control signals to the actuators of the respective brake 72, motive power generator 73, and transmission 74 for controlling the speed of the own vehicle 101 to track a target preceding vehicle.

Each of the task for assisting lane changes, surround view displaying task, automatic parking task, and adaptive cruise control task is performed based on, for example, the results of the recognition task associated with 1. The lane and road shape information
2. The preceding-vehicle and oncoming-vehicle information
3. The stopped-vehicle information
4. The preceding-pedestrian and oncoming-pedestrian information
5. The stopped-person information
6. The motor-cycle and bicycle information
7. The obstacle and roadside-object information
8. The advertising-sign and traffic-signal information
9. The traffic-marking information.

The blind-spot warning task is designed to (1) Determine whether another vehicle is entering a blind spot at a rear corner of the travelling own vehicle 101

(2) Send a control signal to the actuator of at least one of the buzzer 81 and the speaker 82 when it is determined that another vehicle is entering a blind spot at a rear corner of the travelling own vehicle 101.

The control signal controls the actuator of at least one of the buzzer 81 and the speaker 82, so that at least one of the buzzer 81 and the speaker 82 audibly outputs a warning to occupants of the own vehicle 101. The warning represents the entrance of another vehicle into a blind spot around the own vehicle 101.

The rear cross-traffic warning task is designed to (1) Determine whether another vehicle is entering a blind spot around the rear end of the own vehicle 101 when the own vehicle 101 is rolling backward (2) Send a control signal to the actuator of at least one of the buzzer 81 and the speaker 82 when it is determined that another vehicle is entering the blind spot around the rear end of the own vehicle 101.

The control signal controls the actuator of at least one of the buzzer 81 and the speaker 82, so that at least one of the buzzer 781 and the speaker 82 audibly outputs a warning to occupants of the own vehicle 101. The warning represents the entrance of another vehicle into the blind spot around the rear end of the own vehicle 101.

The front cross-traffic warning task is designed to (1) Determine whether another vehicle exists at a blind spot around the front end of the own vehicle 101 when the own vehicle 101 is located at a blind intersection (2) Send a control signal to the actuator of at least one of the buzzer 81 and the speaker 82 when it is determined that another vehicle exists at the blind spot around the front end of the own vehicle 101.

The control signal controls the actuator of at least one of the buzzer 81 and the speaker 82, so that at least one of the buzzer 81 and the speaker 82 audibly outputs a warning to occupants of the own vehicle 101. The warning represents that another vehicle exists at the blind spot around the front end of the own vehicle 101.

Each of the blind-spot warning task, rear cross-traffic warning task, and front cross-traffic warning task is performed based on, for example, the results of the image recognition task associated with 1. The preceding-vehicle and oncoming-vehicle information
2. The stopped-vehicle information
3. The preceding-pedestrian and oncoming-pedestrian information
4. The stopped-person information
5. The motor-cycle and bicycle information
6. The obstacle and roadside-object information
7. The traffic-sign and traffic-signal information
8. The traffic-marking information.

The inter-vehicle distance warning task is designed to (1) Detect an inter-vehicle distance between the own vehicle 101 and a target preceding vehicle (2) Determine whether the detected inter-vehicle distance is shorter than a predetermined threshold distance (3) Send a control signal to the actuator of at least one of the buzzer 81 and the speaker 82 when it is determined that the detected inter-vehicle distance is shorter than the threshold distance.

The control signal controls the actuator of at least one of the buzzer 81 and the speaker 82, so that at least one of the buzzer 81 and the speaker 82 audibly outputs a warning to occupants of the own vehicle 101. The warning represents that the inter-vehicle distance is shorter than the threshold distance.

The rear-end collision warning task is designed to (1) Determine whether a probability that the own vehicle 101 will collide with the rear end of a preceding vehicle is equal to or higher than a predetermined threshold value (2) Send a control signal to the actuator of at least one of the buzzer 81 and the speaker 82 when it is determined that the probability that the own vehicle 101 will collide with the rear end of a preceding vehicle is equal to or higher than the threshold value.

The control signal controls the actuator of at least one of the buzzer 81 and the speaker 82, so that at least one of the buzzer 781 and the speaker 82 audibly outputs a warning to occupants of the own vehicle 101. The warning represents the danger of collision of the own vehicle 101 with the rear end of a preceding vehicle. Note that the inter-vehicle distance warning task and rear-end collision warning task are performed based on, for example, the results of the image recognition task associated with the preceding-vehicle information.

The erroneous start preventing task is designed to determine whether an accelerator pedal of the own vehicle 101 is operated by a driver of the own vehicle 101 being parked although there is a building or structure in front of the own vehicle 101. Note that whether the accelerator pedal of the own vehicle 101 is operated by the driver of the own vehicle 101 can be measured by an accelerator sensor included in the sensor module 6. The erroneous start preventing task is also designed to send a control signal to the actuator of the brake 72 when it is determined that the accelerator pedal of the own vehicle 101 is operated by the driver of the own vehicle 101 being parked although there is a building or structure in front of the own vehicle 101. The control signal controls the actuator of the brake 72 to prevent start of the own vehicle 101 due to such a driver's erroneous operation of the accelerator pedal. The erroneous start preventing task is performed based on, for example, the results of the image recognition task associated with the building structure information.

Note that the second processing unit 141b can be configured to stop one or more the above vehicle control tasks based on the actuators of target devices associated with motion of the own vehicle 101, such as the steering device 71 and the brake 72, when it is determined that something blocks the view of the camera module 111 based on the camera-view blocking information. The second processing unit 141b can be configured to stop one or more vehicle control tasks when it is determined, based on the meteorological-environment information, that it is difficult to perform the image recognition task according to images picked up by the camera module 111 due to adverse weather conditions including, for example, torrential downpours.

Note that the camera module 111 includes a temperature sensor for measuring the temperature in the camera module 111. The temperature sensor is configured to send, to the first processing unit 141a, a temperature signal indicative of the measured temperature in the camera module 111.

The first processing unit 141a receives the temperature signal sent from the temperature sensor, and determines whether the temperature in the camera module 111 based on the received temperature signal is equal to or higher than a predetermined threshold temperature. Additionally, the first processing unit 141a determines whether there is something that blocks the view of the camera module 111.

When it is determined that the temperature in the camera module 111 based on the received temperature signal is equal to or higher than the threshold temperature, the first processing unit 141a performs, as the recognition task, the second recognition task based on the object information measured by the radar device 52 in priority to the first recognition task. Similarly, when it is determined that there is something that blocks the view of the camera module 111, the first processing unit 141a performs, as the recognition task, the second recognition task based on the object information measured by the radar device 52 in priority to the first recognition task.

Otherwise, when it is determined neither that the temperature in the camera module 111 based on the received temperature signal is equal to or higher than the threshold temperature nor that there is something that blocks the view of the camera module 111, the first processing unit 141a performs, as the recognition task, the first recognition task based on images captured by the camera module 111.

The first processing unit 141a can be configured to perform at least one of the first recognition task and the second recognition task as the above recognition task. For example, the first processing unit 141a can perform only the first recognition task as the above recognition task without performing the second recognition task. The first processing unit 141a can also be configured to perform, as the above recognition task, a fusion recognition task based on combination of images captured by the camera module 111 and the object information measured by the radar device 52.

Advantageous Effects

The camera apparatus 1 according to the first embodiment is configured to recognize, based on images captured by the camera module 111, the situations around the own vehicle 101, and performs, based on the results of the recognition, the various vehicle control tasks set forth above. The above configured camera module 111 of the camera apparatus 1 enables higher-quality images in front of the own vehicle 101 to be captured. This enables the camera apparatus 1 to perform the various vehicle control tasks each with higher accuracy.

The main reason why the camera module 111 captures higher-quality images than a conventional camera module is that the imager 131 of the camera module 111 is designed as a curved imager such that the photo-sensor array 132 of the imager 131 is concavely curved with respect to the lens unit 111a.

The curved imager 131 has higher sensitivity at the peripheral portion of the imaging surface 132a, i.e. the photo-sensor array 132 as compared with a flat imager whose imaging surface is flat. This enables the curved imager 131 to capture higher-quality images as compared with the flat imager. Additionally, the curved imager 131 captures images each having lower aberrations at the peripheral portion thereof as compared with a flat imager. The curved imager 131 also has lower dark current as compared with such a flat imager, because the curved semiconductor photodiodes reduce dark current to be lower than the dark current of such a flat imager. This reduces the level of noise obtained in the curved imager 131 to be lower than the level of noise obtained in such a flat imager, resulting in the curved imager 131 having a wider dynamic range than such a flat imager has.

Higher-accuracy vehicle control requires image sensors each having a wider effective field of view, in other words, requires image sensors each having higher sensitivity at the peripheral portion of the imaging surface of the corresponding image sensor. For example, recognizing, with higher accuracy, the situations of the intersection in front of a running vehicle or detecting whether a pedestrian is leaping out to the road in front of a running vehicle requires images captured by camera apparatuses; each of the images has a resolution at its peripheral portion as high as a resolution at its center portion. This is because the captured images, each of which has a resolution at its peripheral portion as high as a resolution at its center portion, enable vehicles or pedestrians located at the peripheral portion of each captured image to be accurately recognized.

The camera apparatus 1 according to the first embodiment, which includes the camera module 111 configured above, achieves captured images each having higher quality. This results in the camera apparatus 1 improving the object-recognition performance at the peripheral portion of each captured image and the object-recognition performance of each image captured during night-time.

The camera apparatus 1 according to the first embodiment, which includes the camera module 111 configured above, achieves captured images each having lower aberrations at the peripheral portion thereof. This results in reduction of the number of lenses in the lens unit 111a, which is required to capture higher-quality images, as compared with a case where the camera module 111 uses a flat imager.

The reduction in the number of lenses in the lens unit 111a reduces flare and ghost images in each of images captured by the image sensor 11, resulting in the camera apparatus 1 having an improved target recognition performance. The reduction in the number of lenses in the lens unit 111a downsizes the lens unit 111a, resulting in the camera apparatus 1 having a smaller size. The reduction in size of the camera apparatus 1 results in an improvement of the driver's viewability in front of the own vehicle 101, an improvement of the appearance in the occupant compart of the own vehicle 101, and a reduction of the manufacturing and transporting cost of the camera apparatus 1.

The camera apparatus 1 according to the first embodiment, which includes the camera module 111 configured above, achieves a wider high-temperature operating range as compared with such a flat imager, because the curved semiconductor photodiodes of the camera module 111 increase the high-temperature operating range thereof to be higher than the high-temperature operating range of such a flat imager. This reduces the adverse effects due to heat generated by the camera apparatus 1, thus improving the operational stability of the camera apparatus 1; the amount of heat depends on the temperature environments around the own vehicle 101 and/or on the higher functionality of the camera module 111, such as higher resolution and higher frame rate thereof.

Second Embodiment

The following describes an in-vehicle system 200, which includes a camera apparatus 203, according to the second embodiment.

The structure and functions of the in-vehicle system 200 according to the second embodiment are mainly different from those of the in-vehicle system 100 according to the first embodiment by the following point.

Structure of in-Vehicle System

Figure 10:
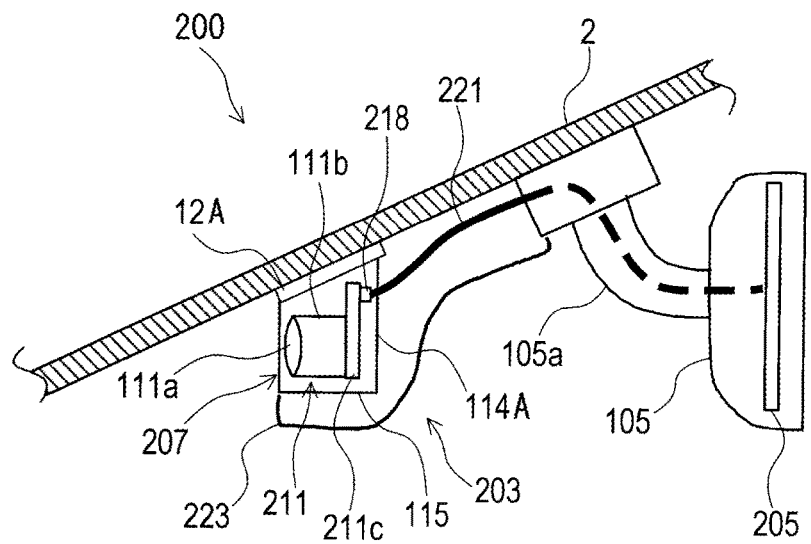
FIG. 10 is a cross sectional view schematically illustrating an in-vehicle system including a camera apparatus and a controller, which are mounted to the windshield of the vehicle according to the second embodiment of the present disclosure.

Referring to FIG. 10, the in-vehicle system 200 includes the camera apparatus 203 and a controller 205 installed in the rearview mirror 105 of the own vehicle 101.

Structure of Camera Apparatus

Referring to FIG. 10, the camera apparatus 203, which is designed as, for example, a monocular camera apparatus, includes, for example, an image sensor 207, a plate-like bracket 12A, and a cover 223. Reference numeral 105a represents a support member mounted on the inner surface of the windshield 2 and configured to support the rearview mirror 105.

Figure 11:
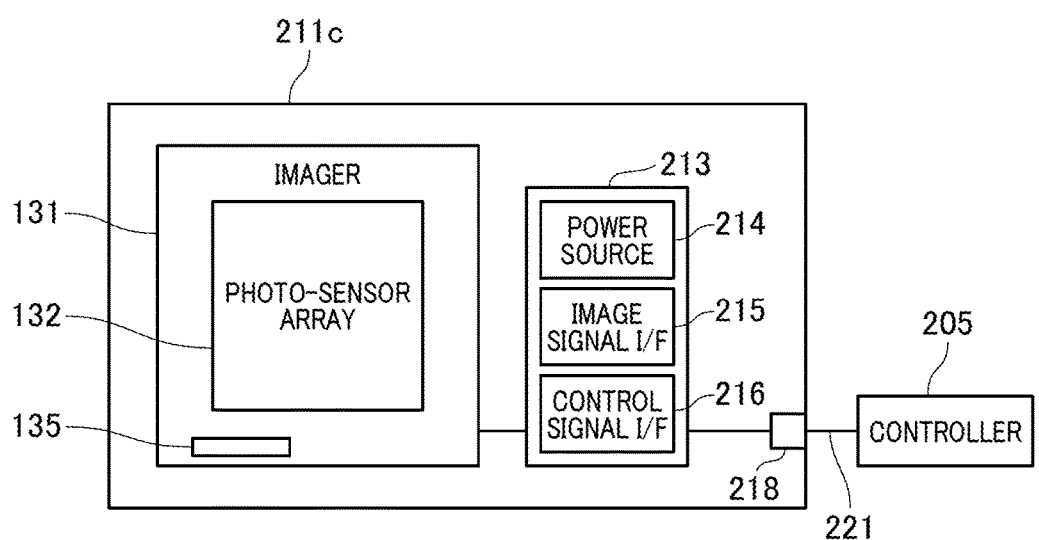
FIG. 11 is a block diagram schematically illustrating an example of the structure of an imaging board of the camera apparatus illustrated in FIG. 10.

The image sensor 207 according to the second embodiment is substantially identical in structure to the image sensor 11 according to the first embodiment except that the imager 131 includes no control board 113. Specifically, the image sensor 207 includes, for example, a camera module 211, a housing 114A, and a bottom cover 115. The camera module 211 includes, for example, an imaging board 211c (see FIG. 11) in place of the imaging board 111c according to the first embodiment. The camera module 211 is contained in the assembly of the housing 114A and the bottom cover 115 like the first embodiment.

The imaging board 211c includes the imager 131, a control circuit 203, and a connector 218.

The control circuit 213 includes a power source 214, an image-signal I/F 215, and a control-signal I/F 216. The control circuit 213 is connected to the controller 205 via the connector 218 and a communication line 221.

The power source 214 supplies operating power to each of the electrical components constituting the imaging board 211c. The image-signal I/F 215 receives the image signal output from the imager 131, and outputs the image signal to the controller 205 via the connector 218 and the communication line 221. The control-signal I/F 216 receives control signals sent from the controller 205 via the connector 218 and the communication line 221; the control signals are operative to control how the imager 131 operates. That is, the control-signal I/F 216 enables the control signals sent from the controller 205 to control the photo-sensor array 132 and the exposure controller 135 of the imager 131.

Like the first embodiment, the housing 114A is configured such that the lens unit 111a and the lens barrel 111b are exposed to the front direction of the own vehicle 101. Like the first embodiment, the housing 114a of the image sensor 207 is mounted on the inner surface of the windshield 2 with the bracket 12A.

Referring to FIG. 10, the communication line 221 is disposed in the support member 105a and the rearview mirror 105 so as to be connected to the controller 205 installed in the rearview mirror 105. This enables the communication line 221 to be securely connected between the connector 218 and the controller 205 installed in the rearview mirror 105.

The cover 223 is mounted to the bottom cover 115 and to the support member 105a to cover the image sensor 207 and the communication line 221. That is, the cover 223 extends from the bottom cover 115 to the support member 105a. This enables the communication line 221 to not be exposed to the inside of the occupant compartment of the own vehicle 101.

Structure of Control Apparatus

Figure 12:
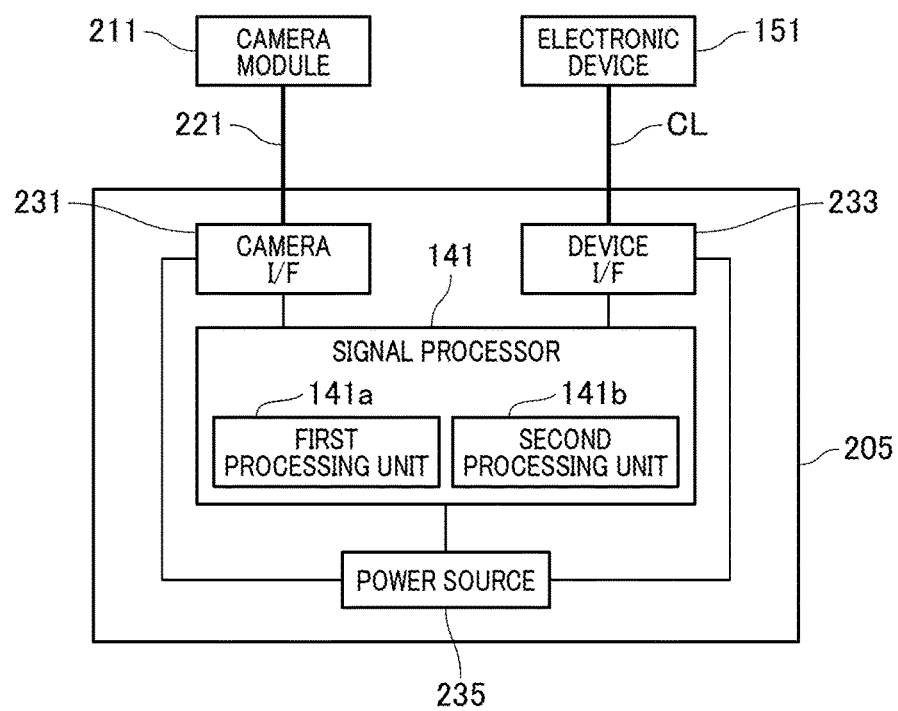
FIG. 12 is a block diagram schematically illustrating an example of the functional structure of the controller illustrated in FIG. 10.

Referring to FIG. 12, the controller 205 includes the signal processor 141, a camera interface (I/F) 231, a device interface 233, and a power source 235.

The camera I/F 231 is connected to the signal processor 141 and to one end of the communication line 221, the other end of which is connected to the camera module 211 via the connector 218. The camera I/F 231 serves as an interface that enables each of the first and second processing units 141a and 141b to communicate with the camera module 211 via the communication line 221.

The device I/F 233 serves as an interface that enables each of the first and second processing units 141a and 141b to communicate with the electronic devices 151 installed in the own vehicle 101. For example, the device I/F 233 includes connectors and an electric or electronic circuit when the image sensor 207 is connected to the electronic devices 151 via communication lines CL. The connectors are connected to the respective communication lines CL, and the electronic circuit establishes communications between the electronic devices 151 and each of the first and second processing units 141a and 141b.

The power source 235 is configured to receive electrical power supplied from an accessory power source and/or a battery installed in the own vehicle 101. Then, the power source 235 supplies electrical power to the individual components of the controller 205.

As described above, the camera apparatus 203 according to the second embodiment is configured such that a part of the camera apparatus 203, i.e. the controller 205, is mounted to the rearview mirror 105 to be separated from the image sensor 207. This enables the image sensor 207 of the camera apparatus 203 to be downsized. This downsizing of the image sensor 207 results in an improvement of the driver's viewability in front of the own vehicle 101, an improvement of the appearance in the occupant compart of the own vehicle 101, and a reduction of the manufacturing and transporting cost of the camera apparatus 203.

The present disclosure is not limited to the aforementioned embodiments. Elements of each of the camera apparatuses 1 and 203 are not essential to camera apparatuses within the scope of the present disclosure except where the elements are clearly described as essential elements or the elements are obviously to be essential. Even if the number of elements, the values of elements, the amounts of elements, and the ranges of elements are disclosed in the specification, the present disclosure is not limited thereto except where they are clearly described as essential or they are principally estimated to be essential. Even if the shapes, locations, and positional relationships of elements are disclosed in the specification, the present disclosure is not limited thereto except if they are clearly described as essential or they are principally estimated to be essential.

Specifically, the following modifications can be included within the scope of the present disclosure, and the modifications can be selectively applied to the first and second embodiments in combination or alone. That is, at least some of the modifications can be freely applied to the first and second embodiments.

The features disclosed in the first and second embodiments can be freely combined with one another within the scope of the present disclosure.

The controller 205 according to the second embodiment can be disposed to another place in the own vehicle 105, which differs from the rearview mirror 105. The image-signal I/F 215 and control-signal I/F 216 according to this modification can be configured as communication modules that wirelessly communicate with the controller 205.

The first processing unit 141a according to the first and second embodiments is configured to perform the recognition task that recognizes the situations around the own vehicle 101, but can be configured to perform a part of the recognition task. For example, the first processing unit 141a and at least one of the electronic devices 151 installed in the own vehicle 101 can be configured to cooperatively perform the recognition task that recognizes the situations around the own vehicle 101.

The second processing unit 141b according to the first and second embodiments is configured to perform, based on the recognized situations around the own vehicle 101, the vehicle control task that controls at least one of the actuators or other similar devices installed in the own vehicle 101. For example, the second processing unit 141b and at least one of the electronic devices 151 installed in the own vehicle 101 can be configured to cooperatively perform the vehicle control task that controls at least one of the actuators or other similar devices installed in the own vehicle 101.

The first processing unit 141a and the second processing unit 141b according to the first embodiment or second embodiment constitute functional modules of the signal processor 141 installed in the control board 113 (first embodiment) or the controller 205 (second embodiment). In other words, the first processing unit 141*a* and the second processing unit 141*b* according to each of the first and second embodiments are constructed of the same electronic components of the signal processor 141. The first processing unit 141*a* and the second processing unit 141*b* however can be constructed of different electronic components, such as integrated circuits, chipsets, microcomputers, and circuit boards.

Specifically, the common chipset or microcomputer can construct both the first processing unit 141*a* and the second processing unit 141*b*, or different chipsets or microcomputers can construct the respective first and second processing units 141*a* and 141*b*. Similarly, the common control board can construct both the first processing unit 141*a* and the second processing unit 141*b*, or different control boards can construct the respective first and second processing units 141*a* and 141*b*.

The assembly of the housing 114 and the bottom cover 115 according to the first embodiment is configured to house the camera module 111, the control board 113, the power source 145, and the electrical connection harness 112. The assembly of the housing 114 and the bottom cover 115 can be configured to house at least one of the camera module 111, the control board 113, the power source 145, and the electrical connection harness 112.

The assembly of the housing 114 and the bottom cover 115 can house at least one of the different electronic components if the different electronic components construct the respective first processor 114*a* and the second processor 114*b*.

The cover 16 covers the image sensor 11, the bracket 12, and the hood 13 from below, but can be configured to cover at least a part of the camera module 111, the signal processor 141, the communication I/F 143, the power source 145, the housing 114, and the bottom cover 115. The cover 16 can cover at least one of the different electronic components if the different electronic components construct the respective first processor 114*a* and the second processor 114*b*.

The assembly of the housing 114A and the bottom cover 115 according to the second embodiment is configured to house the camera module 211. The assembly of the housing 114A and the bottom cover 115 can be configured to house at least one of the camera module 211, the image-signal I/F 215, the control-signal I/F 216, and the power source 214.

The cover 223 covers the image sensor 207 and the communication line 221, but can be configured to cover at least a part of the camera module 211, the image-signal I/F 215, the control-signal I/F 216, the power source 214, the housing 114A, and the bottom cover 115.

Each of the camera apparatuses 1 and 203 according to the first and second embodiment is designed as a monocular camera apparatus, but can be designed as a stereo camera apparatus.

Each of the brackets 12 and 12A according to the first and second embodiment can have one of various structures and shapes as long as the corresponding bracket is configured to fixedly mount a corresponding one of the camera modules 111 and 211 to the windshield 2 via a corresponding one of the housings 114 and 114A. That is, one or more elements can be interposed between each of the camera modules 111 and 211 and a corresponding one of the brackets 114 and 114A as long as the corresponding camera module is fixedly mounted to the windshield 2 with the corresponding bracket. Similarly, one or more elements can be interposed between each of the camera modules 111 and 114A and the windshield 2 as long as the corresponding camera module is fixedly mounted to the windshield 2 with the corresponding bracket.

The first processing unit 141*a* according to the first and second embodiments can be configured to perform the recognition task to recognize a selected one of
  (1) The lane information
  (2) The road shape information
  (3) The road surface information
  (4) The light source information
  (5) The preceding-vehicle information
  (6) The oncoming-vehicle information
  (7) The stopped-vehicle information
  (8) The preceding-pedestrian information
  (9) The oncoming-pedestrian information
  (10) The stopped-person information
  (11) The motor-cycle information
  (12) The bicycle information
  (13) The obstacle information
  (14) The roadside-object information
  (15) The traffic-sign information
  (16) The traffic-signal information
  (17) The traffic-marking information
  (18) The advertising-sign information
  (19) The tunnel information
  (20) The emergency-bay information
  (21) The camera-view blocking information
  (22) The meteorological-environment information
  (23) The building structure information.

The second processing unit 141*b* according to the first and second embodiments can be configured to select at least two of the lane departure warning task, headlight control task, and the task for preventing front collisions, and perform the selected at least two tasks. The second processing unit 141*b* according to the first and second embodiments can also be configured to perform, in addition to the selected at least two tasks, at least one of the following tasks
  1. The lane keeping task
  2. The task for preventing broadside collisions
  3. The task for preventing collisions at intersections
  4. The sign displaying task
  5. The speed-limit displaying task
  6. The over-speed warning task
  7. The automatic wiper task
  8. The task for assisting lane changes
  9. The surround view displaying task
  10. The automatic parking task
  11. The adaptive cruise control task
  12. The blind-spot warning task
  13. The rear cross-traffic warning task
  14. The front cross-traffic warning task
  15. The inter-vehicle distance warning task
  16. The rear-end collision warning task
  17. The erroneous start preventing task.

While the illustrative embodiments and their modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A camera apparatus installable to a vehicle that includes a windshield and an electronic device installed thereto, the camera apparatus comprising:
   a camera module having a predetermined field of view and configured to capture an image in front of the vehicle via a predetermined wiping area of the windshield of the vehicle;
   a first processing unit configured to perform, based on the image captured by the camera module, at least part of a recognition task that recognizes situations in front of the vehicle;
   a second processing unit configured to perform, based on a result of the recognition task performed by the first processing unit, at least part of a vehicle control task, the vehicle control task including at least two of:
      a lane departure warning task for determining whether there is an unintentional departure of the vehicle from a lane on which the vehicle is running;
      a headlight control task for controlling a headlight of the vehicle; and
      a task for preventing front collisions of the vehicle;
   a communication interface that enables the first and second processing units to communicate with the electronic device installed in the vehicle;
   a power source that supplies electrical power to the camera module, the first processing unit, and the second processing unit;
   a housing configured to house at least part of at least one of the camera module, the first processing unit, the second processing unit, the communication interface, and the power source;
   a cover configured to cover at least part of at least one of the camera module, the first processing unit, the second processing unit, the communication interface, the power source, and the housing; and
   a mounting member configured to fixedly mount the camera module to the windshield of the vehicle such that the field of view of the camera module is directed in front of the vehicle,
   the camera module comprising:
      a lens unit comprising a plurality of lenses;
      a barrel configured to house the lens unit; and
      an image sensor including a photo-sensor array comprised of photo sensors, each of the photo sensors having a light receiving area, the image sensor having an imaging surface based on the light receiving areas of the photo sensors, so that the image sensor has an imaging surface composed of the light receiving areas of the photo sensors, the image sensor being arranged with respect to the lens unit such that light passing through the plurality of lenses of the lens unit forms an image on the imaging surface, the image sensor comprising at least part of an exposure controller that controls an exposure of the imaging surface, the photo sensor array being concavely curved with respect to the lens unit, so that the imaging surface is concavely curved with respect to the lens unit.

2. The camera apparatus according to claim 1, wherein the recognition task includes at least one of:
   (i) lanes ahead of the vehicle;
   (ii) a shape of a road ahead of the vehicle;
   (iii) a condition of a road surface ahead of the vehicle;
   (iv) at least one light source ahead of the vehicle;
   (v) at least one preceding vehicle ahead of the vehicle;
   (vi) at least one oncoming vehicle;
   (vii) at least one stopped vehicle around the vehicle;
   (viii) at least one preceding pedestrian around the vehicle;
   (ix) at least one oncoming pedestrian ahead of the vehicle;
   (x) at least one stopping person around the vehicle;
   (xi) at least one motor cycle around the vehicle;
   (xii) at least one bicycle around the vehicle;
   (xiii) at least one obstacle around the vehicle;
   (xiv) at least one roadside object around the vehicle;
   (xv) at least one traffic sign around the vehicle;
   (xvi) at least one traffic signal around the vehicle;
   (xvii) at least one traffic marking around the vehicle;
   (xviii) at least one advertising sign around the vehicle;
   (xix) a tunnel through which the vehicle is going to go;
   (xx) at least one emergency parking bay;
   (xx1) something that blocks the view of the camera module;
   (xxii) a meteorological environment around the vehicle; and
   (xxiii) at least one building structure around the vehicle.

3. The camera apparatus according to claim 1, wherein the second processing unit is configured to perform, in addition to the at least two of the lane departure warning task, the headlight control task, and the task for preventing front collisions of the vehicle, at least one of:
   (a) a lane keeping task;
   (b) a task for preventing broadside collisions;
   (c) a task for preventing collisions at intersections;
   (d) a sign displaying task;
   (e) a speed-limit displaying task;
   (f) an over-speed warning task;
   (g) an automatic wiper task;
   (h) a task for assisting lane changes;
   (i) a surround view displaying task;
   (j) an automatic parking task;
   (k) an adaptive cruise control task;
   (l) a blind-spot warning task;
   (m) a rear cross-traffic warning task;
   (n) a front cross-traffic warning task;
   (o) an inter-vehicle distance warning task;
   (p) a rear-end collision warning task; and
   (q) an erroneous start preventing task.

4. The camera apparatus according to claim 2, wherein the second processing unit is configured to perform, in addition to the at least two of the lane departure warning task, the headlight control task, and the task for preventing front collisions of the vehicle, at least one of:
   (a) a lane keeping task;
   (b) a task for preventing broadside collisions;
   (c) a task for preventing collisions at intersections;
   (d) a sign displaying task;
   (e) a speed-limit displaying task;
   (f) an over-speed warning task;
   (g) an automatic wiper task;
   (h) a task for assisting lane changes;
   (i) a surround view displaying task;
   (j) an automatic parking task;
   (k) an adaptive cruise control task;
   (l) a blind-spot warning task;
   (m) a rear cross-traffic warning task;
   (n) a front cross-traffic warning task;
   (o) an inter-vehicle distance warning task;
   (p) a rear-end collision warning task; and
   (q) an erroneous start preventing task.

5. The camera apparatus according to claim 1, wherein the first processing unit and the second processing unit are functional components constructed by a common electronic component.

6. An in-vehicle system comprising:
a camera apparatus installed in a vehicle, the vehicle including a windshield, a rearview mirror, and an electronic device installed thereto; and
a controller installed in the rearview mirror,
the camera apparatus comprising:
a camera module having a predetermined field of view and configured to capture an image in front of the vehicle via a predetermined wiping area of the windshield of the vehicle;
a first communication interface that enables the camera module to communicate with the controller;
a power source that supplies electrical power to the camera module;
a housing configured to house at least part of at least one of the camera module, the first communication interface, and the power source;
a cover configured to cover at least part of at least one of the camera module, the first communication interface, the power source, and the housing; and
a mounting member configured to fixedly mount the camera module to the windshield of the vehicle such that the field of view of the camera module is directed in front of the vehicle,
the camera module comprising:
a lens unit comprising a plurality of lenses;
a barrel configured to house the lens unit; and
an image sensor including a photo-sensor array comprised of photo sensors, each of the photo sensors having a light receiving area, the image sensor having an imaging surface based on the light receiving areas of the photo sensors, so that the image sensor has an imaging surface composed of the light receiving areas of the photo sensors, the image sensor being arranged with respect to the lens unit such that light passing through the plurality of lenses of the lens unit forms an image on the imaging surface, the image sensor comprising at least part of an exposure controller that controls an exposure of the imaging surface, the photo sensor array being concavely curved with respect to the lens unit, so that the imaging surface is concavely curved with respect to the lens unit,
the controller comprising:
a second communication interface that enables the controller to communicate with the camera module;
a first processing unit configured to perform, based on the image captured by the camera module, at least part of a recognition task that recognizes situations in front of the vehicle;
a second processing unit configured to perform, based on a result of the recognition task performed by the first processing unit, at least part of a vehicle control task,
the vehicle control task including at least two of: a lane departure warning task for determining whether there is an unintentional departure of the vehicle from a lane on which the vehicle is running, a headlight control task for controlling a headlight of the vehicle, and a task for preventing front collisions of the vehicle;
a third communication interface that enables the first and second processing units to communicate with the electronic device installed in the vehicle; and
a power source that supplies electrical power to the first processing unit and the second processing unit.

7. The in-vehicle system according to claim 6, wherein the recognition task includes at least one of:

(i) lanes ahead of the vehicle;
(ii) a shape of a road ahead of the vehicle;
(iii) a condition of a road surface ahead of the vehicle;
(iv) at least one light source ahead of the vehicle;
(v) at least one preceding vehicle ahead of the vehicle;
(vi) at least one oncoming vehicle;
(vii) at least one stopped vehicle around the vehicle;
(viii) at least one preceding pedestrian around the vehicle;
(ix) at least one oncoming pedestrian ahead of the vehicle;
(x) at least one stopping person around the vehicle;
(xi) at least one motor cycle around the vehicle;
(xii) at least one bicycle around the vehicle;
(xiii) at least one obstacle around the vehicle;
(xiv) at least one roadside object around the vehicle;
(xv) at least one traffic sign around the vehicle;
(xvi) at least one traffic signal around the vehicle;
(xvii) at least one traffic marking around the vehicle;
(xviii) at least one advertising sign around the vehicle;
(xix) a tunnel through which the vehicle is going to go;
(xx) at least one emergency parking bay;
(xx1) something that blocks the view of the camera module;
(xxii) a meteorological environment around the vehicle; and
(xxiii) at least one building structure around the vehicle.

8. The camera apparatus according to claim 6, wherein the second processing unit is configured to perform, in addition to the at least two of the lane departure warning task, the headlight control task, and the task for preventing front collisions of the vehicle, at least one of:
(a) a lane keeping task;
(b) a task for preventing broadside collisions;
(c) a task for preventing collisions at intersections;
(d) a sign displaying task;
(e) a speed-limit displaying task;
(f) an over-speed warning task;
(g) an automatic wiper task;
(h) a task for assisting lane changes;
(i) a surround view displaying task;
(j) an automatic parking task;
(k) an adaptive cruise control task;
(l) a blind-spot warning task;
(m) a rear cross-traffic warning task;
(n) a front cross-traffic warning task;
(o) an inter-vehicle distance warning task;
(p) a rear-end collision warning task; and
(q) an erroneous start preventing task.

9. The camera apparatus according to claim 7, wherein the second processing unit is configured to perform, in addition to the at least two of the lane departure warning task, the headlight control task, and the task for preventing front collisions of the vehicle, at least one of:
(a) a lane keeping task;
(b) a task for preventing broadside collisions;
(c) a task for preventing collisions at intersections;
(d) a sign displaying task;
(e) a speed-limit displaying task;
(f) an over-speed warning task;
(g) an automatic wiper task;
(h) a task for assisting lane changes;
(i) a surround view displaying task;
(j) an automatic parking task;
(k) an adaptive cruise control task;
(l) a blind-spot warning task;
(m) a rear cross-traffic warning task;
(n) a front cross-traffic warning task;
(o) an inter-vehicle distance warning task;

(p) a rear-end collision warning task; and (q) an erroneous start preventing task.

10. The camera apparatus according to claim 6, wherein the first processing unit and the second processing unit are functional components constructed by a common electronic component.

11. A camera apparatus installable to a vehicle that includes a windshield and an electronic device installed thereto, the camera apparatus comprising:
- a camera module having a predetermined field of view and configured to capture an image in front of the vehicle via a predetermined wiping area of the windshield of the vehicle;
- a communication interface that enables the camera module to communicate with the electronic device installed in the vehicle;
- a power source that supplies electrical power to the camera module;
- a housing configured to house at least part of at least one of the camera module, the communication interface, and the power source;
- a cover configured to cover at least part of at least one of the camera module, the communication interface, the power source, and the housing; and
- a mounting member configured to fixedly mount the camera module to the windshield of the vehicle such that the field of view of the camera module is directed in front of the vehicle, the camera module comprising:
- a lens unit comprising a plurality of lenses;
- a barrel configured to house the lens unit; and
- an image sensor including a photo-sensor array comprised of photo sensors, each of the photo sensors having a light receiving area, the image sensor having an imaging surface based on the light receiving areas of the photo sensors, so that the image sensor has an imaging surface composed of the light receiving areas of the photo sensors, the image sensor being arranged with respect to the lens unit such that light passing through the plurality of lenses of the lens unit forms an image on the imaging surface, the image sensor comprising at least part of an exposure controller that controls an exposure of the imaging surface, the photo sensor array being concavely curved with respect to the lens unit, so that the imaging surface is concavely curved with respect to the lens unit.

12. The camera apparatus according to claim 1, wherein the imaging surface of the image sensor is concavely curved with respect to a surface of the lens unit that faces the imaging surface.

* * * * *